(12) United States Patent
Sugitani et al.

(10) Patent No.: US 8,683,482 B2
(45) Date of Patent: Mar. 25, 2014

(54) COMPUTER SYSTEM FOR BALANCING ACCESS LOAD OF STORAGE SYSTEMS AND CONTROL METHOD THEREFOR

(75) Inventors: Hiroshi Sugitani, Yokohama (JP); Yuki Komatsu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 2275 days.

(21) Appl. No.: 11/296,313

(22) Filed: Dec. 8, 2005

(65) Prior Publication Data
US 2007/0094357 A1     Apr. 26, 2007

(30) Foreign Application Priority Data
Oct. 20, 2005     (JP) .................................. 2005-305749

(51) Int. Cl.
*G06F 9/46* (2006.01)

(52) U.S. Cl.
USPC ......................................................... 718/105

(58) Field of Classification Search
USPC ......................................................... 718/105
See application file for complete search history.

(56) References Cited

U.S. PATENT DOCUMENTS

| | | | | |
|---|---|---|---|---|
| 6,173,306 B1 * | 1/2001 | Raz et al. | ........................ | 718/102 |
| 6,341,333 B1 * | 1/2002 | Schreiber et al. | ............. | 711/114 |
| 6,535,954 B2 | 3/2003 | Obara et al. | | |
| 7,047,360 B2 | 5/2006 | Soejima et al. | | |
| 7,136,975 B2 | 11/2006 | Ozaki et al. | | |
| 7,181,509 B2 | 2/2007 | Soejima et al. | | |
| 7,305,520 B2 | 12/2007 | Voigt et al. | | |
| 2004/0143832 A1 * | 7/2004 | Yamamoto et al. | ........... | 717/174 |
| 2004/0153604 A1 * | 8/2004 | Nagasawa et al. | ............ | 711/113 |
| 2005/0015657 A1 * | 1/2005 | Sugiura et al. | .................... | 714/6 |
| 2005/0120174 A1 * | 6/2005 | Uratani et al. | ................ | 711/114 |

FOREIGN PATENT DOCUMENTS

| | | |
|---|---|---|
| JP | 07-121307 | 5/1995 |
| JP | 11-296313 | 10/1999 |
| JP | 2000-330924 | 11/2000 |
| JP | 2003-337721 | 11/2003 |
| JP | 2004-246852 | 9/2004 |
| JP | 2005-141381 | 6/2005 |
| JP | 2005-157867 | 6/2005 |
| JP | 2005-222539 | 8/2005 |

OTHER PUBLICATIONS

Office Action in JP 2005-305749, mailed Feb. 22, 2011, (in Japanese) [3 pgs.] with partial English language concise explanation (2 pgs.).

* cited by examiner

*Primary Examiner* — Gregory A Kessler
(74) *Attorney, Agent, or Firm* — Antonelli, Terry, Stout & Kraus, LLP.

(57) ABSTRACT

Provided is a control method for a computer system including one or more host computers, one or more storage systems, and a management computer. The storage system includes a plurality of controllers connected to the host computers through a network, and one or more logical volumes for storing data used by the host computers. At least one of the logical volumes is assigned to at least one of the controllers. According to the control method, when performance information of a controller exceeds a predetermined threshold, the logical volume assigned to the controller is assigned to another controller other than the controller. Thus, access loads on a storage system used in a network environment are balanced.

28 Claims, 17 Drawing Sheets

PERFORMANCE INFORMATION MANAGEMENT TABLE

| STORAGE | DISK CONTROLLER | CPU USAGE RATE |
|---|---|---|
| STORAGESYSTEM 1 | DISK CONTROLLER 1 | 80% |
| STORAGESYSTEM 1 | DISK CONTROLLER 2 | 10% |
| STORAGESYSTEM 2 | DISK CONTROLLER 3 | 20% |
| : | : | : |

FIG. 3

VOLUME INFORMATION MANAGEMENT TABLE

| STORAGE | DISK CONTROLLER | LOGICAL VOLUME | DATA I/O AMOUNT |
|---|---|---|---|
| STORAGE SYSTEM 1 | DISK CONTROLLER 1 | VOL 1 | 500KB/S |
| STORAGE SYSTEM 1 | DISK CONTROLLER 1 | VOL 2 | 300KB/S |
| STORAGE SYSTEM 1 | DISK CONTROLLER 2 | VOL 3 | 100KB/S |
| STORAGE SYSTEM 2 | DISK CONTROLLER 3 | VOL 1 | 100KB/S |
| STORAGE SYSTEM 2 | DISK CONTROLLER 3 | VOL 2 | 100KB/S |
| : | : | : | : |

FIG. 4

HOST - STORAGE CONNECTION INFORMATION MANAGEMENT TABLE

204

| | 501 | 502 | 503 | 504 |
|---|---|---|---|---|
| | HOST | STORAGE | DISK CONTROLLER | ASSIGNED VOLUME |
| 511 | HOST 1 | STORAGE SYSTEM 1 | DISK CONTROLLER 1 | VOL1,VOL2 |
| 512 | HOST 1 | STORAGE SYSTEM 1 | DISK CONTROLLER 2 | VOL3 |
| 513 | HOST 1 | STORAGE SYSTEM 2 | DISK CONTROLLER 3 | VOL1,VOL2 |
| | : | : | : | : |

*FIG. 5*

VOLUME PAIR STATE MANAGEMENT TABLE

205

| | 601 | 602 | 603 | 604 | 605 |
|---|---|---|---|---|---|
| | ID | STORAGE | LOGICAL VOLUME | PRIMARY/SECONDARY | PAIR VOLUME ID |
| 611 | 1 | STORAGE SYSTEM 1 | VOL 1 | PRIMARY | 2 |
| 612 | 2 | STORAGE SYSTEM 2 | VOL 2 | SECONDARY | 1 |
| | : | : | : | : | : |

*FIG. 6*

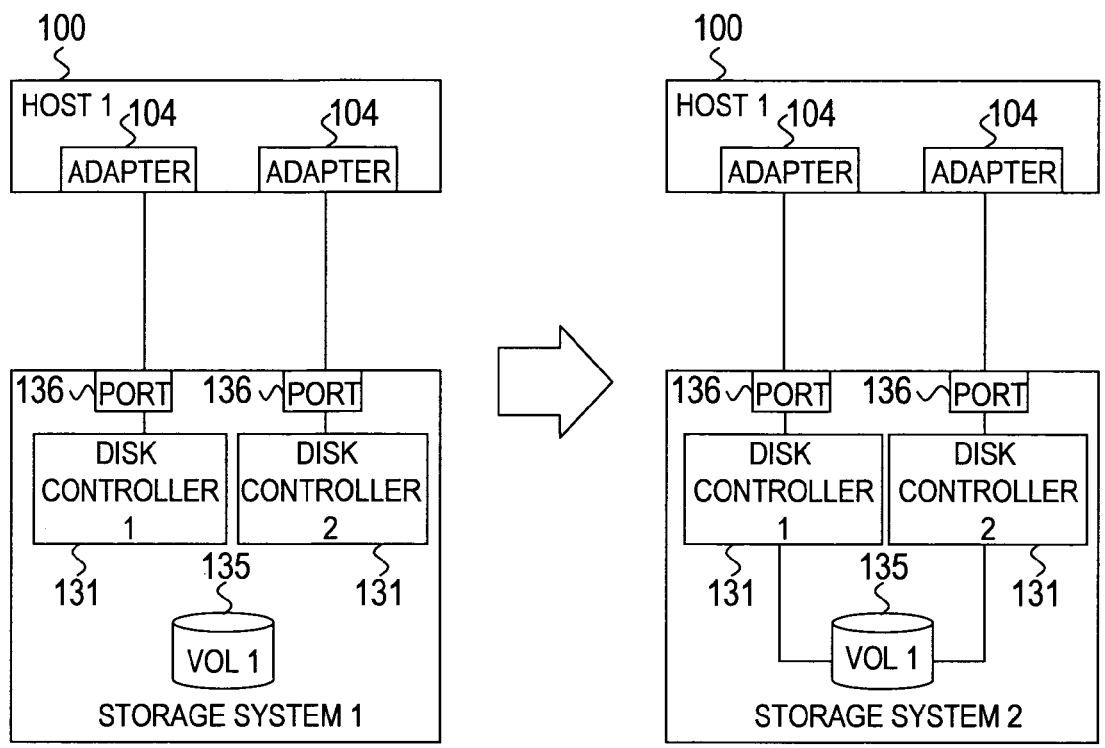
FIG. 7A  FIG. 7B

DISK CONTROLLER ADDITION PROCESSING

DISK CONTROLLER ADDITION PROCESSING

COMPUTER SYSTEM FOR BALANCING ACCESS LOAD OF STORAGE SYSTEMS AND CONTROL METHOD THEREFOR

CROSS-REFERENCE TO PRIOR APPLICATION

This application relates to and claims priority from Japanese Patent Application No. 2005-305749, filed on Oct. 20, 2005 the entire disclosure of which is incorporated herein by reference.

BACKGROUND

This invention relates to a computer system which includes one or more storage systems, and more particularly to access load balancing for a storage system.

As regards a computer system where a host computer and one or more storage systems are interconnected through a network, there has been known a technology of setting a plurality of access paths between the storage systems and the host computer to balance accesses from the host computer to the storage systems (e.g. refer to JP 2000-330924 A). According to such a load balancing technology, access (I/O) loads are balanced across a plurality of paths to prevent a situation where performance is impaired due to a concentration of accesses in a specific path. Additionally, when a failure occurs in one path, an access is assigned to another normal path. Thus, it is possible to continue accessing even when a failure occurs in a path.

SUMMARY

In an environment where a plurality of host computers and one or more storage systems are interconnected through a network, the plurality of host computers may share one storage system. According to the conventional load balancing technology disclosed in JP 2000-330924 A, the host computer recognizes the plurality of paths for the storage systems, and assigns accesses to these paths to balance loads. However, the host computer cannot know an access amount to storage systems of another host computer. Further, by the conventional load balancing technology, it is impossible to set a new path or to release a path that has been set according to an access load. As a result, it is impossible to properly balance the access loads among all the computer systems.

This invention provides a control method for a computer system including one or more host computers, one or more storage systems, and a management computer, in which the host computer and the storage system are connected to the management computer through a first network, the host computer and the storage system are connected to each other through a second network, the management computer includes: a first interface connected to the first network; a first processor connected to the first interface; and a first memory connected to the first processor, the host computer includes: a second interface connected to the first network; a third interface connected to the second network; a second processor connected to the second interface and the third interface; and a second memory connected to the second processor, the storage system includes: a fourth interface connected to the first network; a third processor connected to the fourth interface; a third memory connected to the third processor; one or more fifth interfaces connected to the second network; a plurality of controllers connected to the one or more fifth interfaces; and one or more logical volumes for storing data used by the host computer, each of the controllers includes: a fourth processor connected to the fifth interface; and a fourth memory connected to the fourth processor, the controllers includes at least one first controller to which one of the logical volumes is assigned and at least one second controller to which the one of the logical volume is not assigned, and the first processor determines whether or not performance information of the first controller exceeds a predetermined threshold; and assigns the logical volume assigned to the first controller to the second controller by the first processor when the performance information of the first controller exceeds the predetermined threshold.

According to an embodiment of this invention, a management server disposed in the computer system monitors loads imposed on paths by accesses from the plurality of host computers, and executes addition, switching, or the like of the paths when necessary. Hence, the loads imposed by the accesses from the host computers can be properly balanced in the entire computer system.

BRIEF DESCRIPTION OF THE DRAWINGS

FIG. 3 is an explanatory diagram of a performance information management table according to the embodiment of this invention.

FIG. 4 is an explanatory diagram of a volume information management table according to the embodiment of this invention.

FIG. 5 is an explanatory diagram of a host-storage connection information management table according to the embodiment of this invention.

FIG. 6 is an explanatory diagram of a volume pair state management table according to the embodiment of this invention.

FIGS. 7A and 7B are explanatory diagrams of logical volume assignment processing to a disk controller according to the embodiment of this invention.

DESCRIPTION OF THE PREFERRED EMBODIMENT

An embodiment of this invention will be described below with reference to the accompanying drawings.

Figure 1:
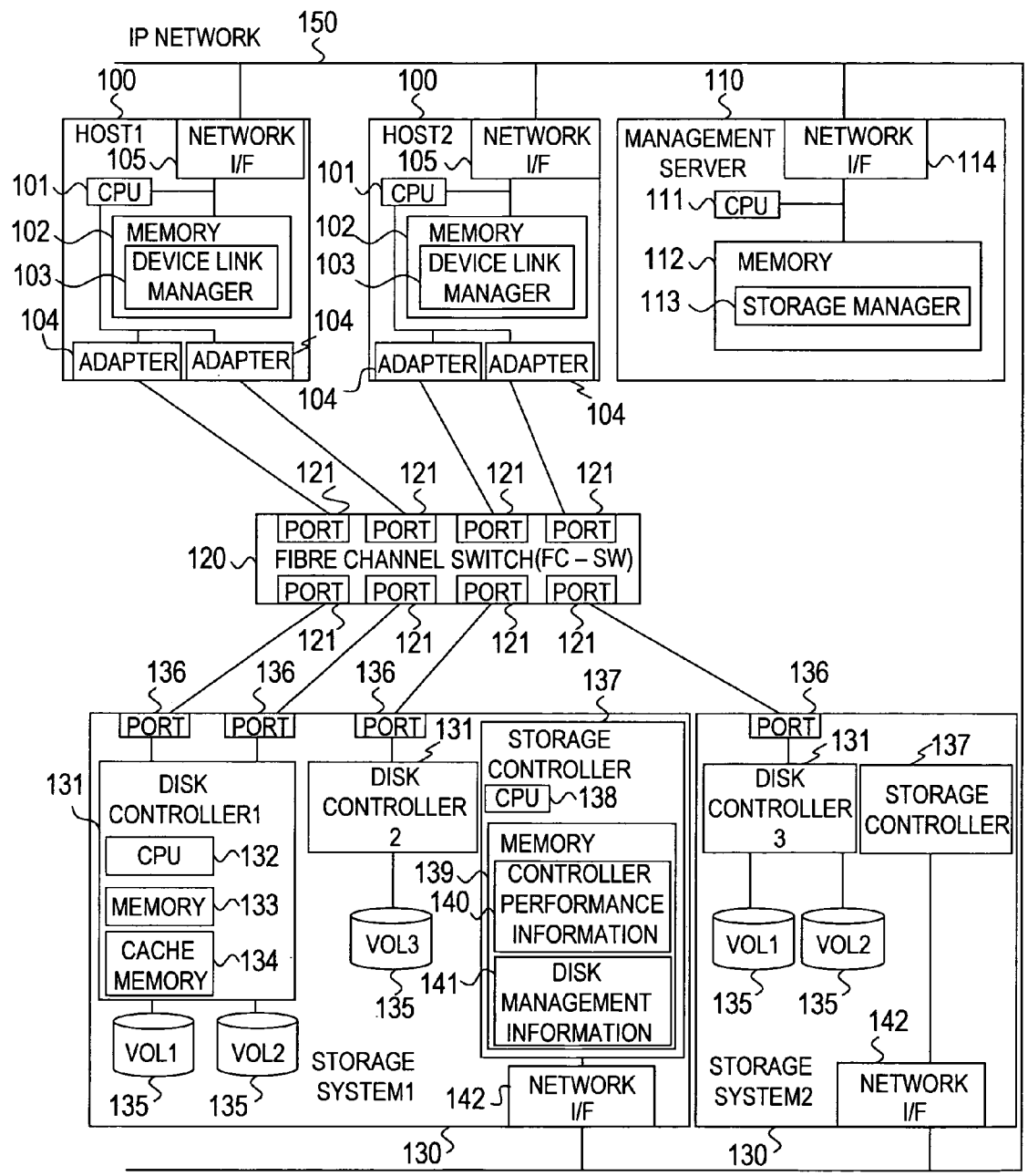
FIG. 1 is a block diagram showing a configuration of a computer system according to an embodiment of this invention.

FIG. 1 is a block diagram showing a configuration of a computer system according to the embodiment of this invention.

The computer system of this embodiment includes a plurality of hosts 100, one management server 110, and one or more storage systems 130. FIG. 1 shows two hosts 100 and two storage systems 130. However, the computer system of the embodiment may include three or more hosts 100 and three or more storage systems 130.

Each host 100 and each storage system 130 are interconnected through a fibre channel switch (FC-SW) 120. Each host 100, the management server 110, and each storage system 130 are interconnected through an Internet protocol (IP) network 150.

The host 100 is a computer which includes a CPU 101, a memory 102, an adapter 104, and a network interface (I/F) 105 connected to one another.

The CPU 101 is a processor for executing software stored in the memory 102.

The memory 102 stores the software executed by the CPU 101. The memory 102 of the embodiment stores at least an operating system (OS, not shown), an application program (not shown), and a device link manager 103.

The application program is executed to realize a predetermined function, and issues as needed an access request (I/O request) to data stored in the storage system 130. The I/O request is specifically a write or read request.

The device link manager 103 is software (so-called alternate path management software) for executing processing to assign the access request issued from the application program to a usable path. According to the embodiment, "path" means a data access path leading from the host 100 to a logical volume 135 (described below) of an access request target. When there are a plurality of usable paths, the device link manager 103 selects a path to balance access loads, and assigns I/O to the path. When a path that has been used cannot be used any more due to a failure or the like, the device link manager 103 assigns I/O to another usable path. The device link manager 103 includes a program (not shown) for executing such path selection and assignment, and information (not shown) or the like referred to by the program.

The adapter 104 is an interface (so-called host bus adapter (HBA)) connected to the FC-SW 120 to communicate with the storage system 130 therethrough. The host 100 may include a plurality of adapters 104.

The network I/F 105 is connected to the IP network 150 to communicate with the management server 110 and the storage system 130 therethrough.

According to the embodiment, each host 100 is identified by a host identifier. "Host 1" and "host 2" shown in FIG. 1 indicate hosts 100 whose host identifiers are "1" and "2". Hereinafter, the host 100 whose host identifier is "1" will be simply referred to as a host 1, and the host 100 whose host identifier is "2" will be simply referred to as a host 2.

The management server 110 is a computer which includes a CPU 111, a memory 112, and a network I/F 114 connected to one another.

The CPU 111 is a processor for executing software stored in the memory 112.

The memory 112 stores the software executed by the CPU 111. The memory 112 of the embodiment stores at least a storage manager 113. The storage manager 113 is software for monitoring access loads, and executing path addition, switching, or the like to balance access loads. The storage manager 113 will be described below in detail by referring to FIG. 2 or the like.

The network I/F 114 is connected to the IP network 150 to communicate with the host 100 and the storage system 130 therethrough.

The storage system 130 stores data used by the host 100. Specifically, the storage system 130 stores data written by the application program of the host 100. The storage system 130 includes one or more disk controllers 131, one or more ports 136, a storage controller 137, a network I/F 142, and a disk drive (not shown).

The storage system 130 may include a plurality of disk drives (e.g., hard disk drives). The plurality of disk drives may constitute redundant arrays of inexpensive disks (RAID).

A storage area of the disk drive is recognized as one or more logical volumes 135 by the OS of the host 100. In other words, the host 100 recognizes one logical volume 135 as one logical disk drive. Accordingly, the application program of the host 100 issues an access request by targeting one of the logical volumes 135.

The storage system 130 can set an arbitrary number and an arbitrary capacity of logical volumes 135 on the disk drive. One logical volume 135 may be constituted of storage areas of a plurality of disk drives. Each logical volume 135 is assigned to at least one disk controller 131. The assignment of the logical volume 135 to the disk controller 131 means setting of a path to reach the logical volume 135 through the disk controller 131. In other words, the host 100 connected to the disk controller 131 can access the logical volume 135 through the disk controller 131.

Processing of assigning the logical volume 135 to the disk controller 131 means recognition by the host 100 and the device link manager 103 of the host 100 that the host 100 can access the logical volume 135 through the disk controller 131. More specifically, by the assignment processing, assignment information (not shown) for associating the disk controller 131 and the logical volume 135 with each other, i.e., information indicating that the host 100 can access the logical volume 135 through the disk controller 131, is stored in the memory 133 of the disk controller 131.

When such assignment information is changed, a host-storage connection state management table 204 (described below) of the management sever 110 is updated. The management server 110 may periodically refer to the assignment information of the storage system 130 or the storage system 130 may announce a change of the assignment information of the storage system 130 to the management server 110, to realize the updating of the host-storage connection state management table 204.

The device link manager 103 makes an inquiry about information indicating a logical volume 135 to be accessed to all the disk controllers 131 connected to the host 100 to recognize a disk controller 131 (a plurality of disk controllers 131 if the plurality are present) which the host 100 can use to access the logical volume 135. Then, the device link manager 103 assigns I/O to a path (i.e., usable path) which passes through the usable disk controller 131.

The disk controller 131 is a controller for connecting the storage system 130 to a SAN (described below). Specifically, the disk controller 131 receives an access request from the host 100 through the port 136 and the FC-SW 120. Then, according to the received access request, the disk controller 131 writes data in the logical volume 135 assigned to itself or reads data therefrom.

FIG. 1 shows three disk controllers 131. These disk controllers are similar in configuration to one anther, and thus configurations of the two disk controllers 131 are not shown.

The disk controller 131 of the embodiment includes a CPU 132, a memory 133, and a cache memory 134 connected to one another.

The CPU 132 is a processor for executing software stored in the memory 133. The CPU 132 is also connected to the port 136.

The memory 133 stores the software executed by the CPU 132. The memory 133 of the embodiment stores at least a program (not shown) for executing data writing or reading according to a received access request.

The cache memory 134 temporarily stores data written in the logical volume 135 or data read therefrom to increase an access speed. The disk controller 131 does not need to include any cache memory 134 when a high-speed access is not required.

When the host 100 issues a read request with respect to a specific area of the logical volume 135, the cache memory 134 may store data read from an area subsequent to the area (i.e., pre-read data) in addition to data read from the area. The pre-read data is not a target of a read request, but may be read in the future. Especially, when data are sequentially read, e.g., data of the logical volume 135 is backed up, there is a high possibility that the pre-read data will be read. When the pre-read data is read, the disk controller 131 returns the pre-read data stored in the cache memory 134 to the host 100 to realize a high-speed access without accessing the disk drive.

The port 136 is an interface connected to the FC-SW 120. The CPU 132 of the disk controller 131 can communicate with the host 100 through the port 136 and the FC-SW 120.

The storage controller 137 is a controller for managing configuration information of the storage system 130. FIG. 1 shows two storage controllers 137. However, as these controllers are similar in configuration to each other, a configuration of one storage controller 137 is not shown.

The storage controller 137 of the embodiment includes a CPU 138 and a memory 139 connected to each other.

The CPU 138 is a processor for executing software stored in the memory 139. The CPU 138 is also connected to the network I/F 142.

The memory 139 stores the software executed by the CPU 138. The memory 139 of the embodiment stores at least a program (not shown) for collecting performance information of the disk controllers 131, controller performance information 140, and volume management information 141.

The controller performance information 140 includes collected performance information of the disk controllers 131. For example, the performance information of the disk controller 131 is a CPU usage rate as described below.

The volume management information 141 includes configuration information of the disk controller 131 and the logical volume 135 in the storage system 130. For example, the volume management information 141 may include assignment information indicating which of the disk controllers 131 the logical volume 135 of the storage system 130 has been assigned to.

The network I/F 142 is connected to the IP network 150. The CPU 138 of the storage controller 137 can communicate with the management sever 110 through the network I/F 142 and the IP network 150.

According to the embodiment, each storage system 130 is identified by a storage system identifier. "Storage system 1" and "storage system 2" shown in FIG. 1 indicate storage systems 130 whose storage system identifiers are "1" and "2". Hereinafter, the storage systems 130 whose storage system identifiers are "1" and "2" will be respectively referred to as a storage system 1 and a storage system 2.

According to the embodiment, each disk controller 131 is identified by a disk controller identifier. "Disk controller 1", "disk controller 2", and "disk controller 3" shown in FIG. 1 indicate disk controllers 131 whose disk controller identifiers are "1", "2", and "3". Hereinafter, the disk controllers 131 whose disk controller identifiers are "1", "2", and "3" will be respectively referred to as a disk controller 1, a disk controller 2, and a disk controller 3.

According to the embodiment, each logical volume 135 is identified by a unique logical volume identifier in each storage system 130. The storage system of FIG. 1 includes three logical volumes 135. Logical volume identifiers of the logical volumes 135 are respectively "1", "2", and "3". Hereinafter, the logical volumes 135 whose logical volume identifiers are "1", "2", and "3" will be respectively referred to as VOL 1, VOL 2, and VOL 3. The storage system 2 of FIG. 1 includes two logical volumes of VOL 1 and VOL 2.

The FC-SW 120 includes a plurality of ports 121. Each port 121 is connected to the adapter 104 of the host 100 or the port 136 of the storage system 130. The FC-SW 120 constitutes a storage area network (SAN) for interconnecting the host 100 and the storage system 130. In the SAN of the embodiment, a fibre channel protocol (FC protocol) is used. However, other protocols may be used.

Figure 2:
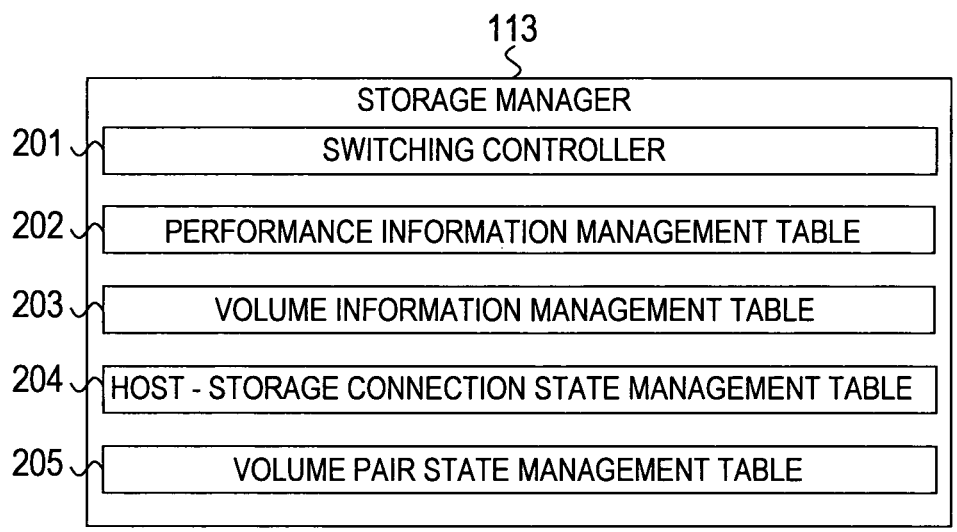
FIG. 2 is an explanatory diagram of a storage manager according to the embodiment of this invention.

FIG. 2 is an explanatory diagram of the storage manager 113 according to the embodiment of this invention.

The storage manager 113 of the embodiment includes a switching controller 201, a performance information management table 202, a volume information management table 203, a host storage connection state management table 204, and a volume pair state management table 205. The switching controller 201 is a program executed by the CPU 111. Each table included in the storage manager 113 includes information referred to by the switching controller 201.

The switching controller 201 is a program for executing path switching, addition, and the like. Processing executed by the switching controller 201 will be described below with reference to a flowchart.

The performance information management table 202 is used to manage performance information of the disk controller 131 of the storage system 130. Specifically, information regarding an access load of each disk controller 131 is registered in the performance information management table 202. The performance information management table 202 will be described below in detail by referring to FIG. 3.

The volume information management table 203 is used to manage performance information of each logical volume 135 of the storage system 130. Specifically, information regarding an access amount of each logical volume 135 is registered in the volume information management table 203. The volume information management table 203 will be described below in detail by referring to FIG. 4.

The host storage connection state management table 204 is used to manage physical configurations of the host 100 and the storage system 130. Specifically, information regarding a physical connection between the host 100 and the storage system 130 is registered in the host storage connection state management table 204. The host storage connection state management table 204 will be described below in detail by referring to FIG. 5.

The volume pair state management table 205 is used to manage a remote copy pair (described below) made between the storage systems 130. Specifically, information regarding logical volumes 135 making a pair is registered in the volume pair state management table 205. The volume pair state management table 205 will be described below in detail by referring to FIG. 6.

FIG. 3 is an explanatory diagram of the performance information management table 202 according to the embodiment of this invention.

In the performance information management table 202, one line corresponds to one disk controller 131.

The performance information management table 202 includes a storage 301, a disk controller 302, and a CPU usage rate 303.

In the storage 301, information indicating the storage system 130 including each disk controller 131 is registered.

In the disk controller 302, information indicating each disk controller 131 is registered.

In the CPU usage rate 303, information indicating a CPU usage rate of the CPU 132 of each disk controller 131 is registered.

In an example of FIG. 3, a storage system 1, a disk controller 1, and 80% are respectively registered as the storage 301, the disk controller 302, and the CPU usage rate 303 (line 311). This indicates that a CPU usage rate of the CPU 132 of the disk controller 1 of the storage system 1 is 80%.

Similarly, in the example of FIG. 3, the storage system 1, a disk controller 2, and 10% are registered (line 312), and a storage system 2, a disk controller 3, and 20% are registered (line 313). These mean that a CPU usage rate of the CPU 132 of the disk controller 2 of the storage system 1 is 10%, and a CPU usage rate of the CPU 132 of the disk controller 3 of the storage system 2 is 20%.

It should be noted that the CPU usage rate is measured by the storage controller 137 of each storage system 130, and stored as controller performance information 140 in the memory 139. The storage manager 113 may periodically refer to the controller performance information 140 to update the CPU usage rate 303.

According to the embodiment, the CPU usage rate of the CPU 132 is used as the performance information of the disk controller 131. However, this invention can be implemented by using another index as the performance information of the disk controller 131. For example, an index that can be used is an access data amount (MB/second) or the number of accessing times (times/second).

FIG. 4 is an explanatory diagram of the volume information management table 203 according to the embodiment of this invention.

One line corresponds to one path in the volume information management table 203.

The volume information management table 203 includes a storage 401, a disk controller 402, a logical volume 403, and a data I/O volume 404.

In the storage 401, information indicating the storage system 130 including the disk controller 131 through which each path passes is registered.

In the disk controller 402, information indicating the disk controller 131 through which each path passes is registered.

In the logical volume 403, information indicating the logical volume 135 to which each path is connected is registered.

In the data I/O amount 404, a data I/O amount per unit time in each path, i.e., information indicating an amount of data written or read per unit time, is registered. As in the case of the CPU usage rate 303, the data I/O amount 404 may be measured by the storage controller 137 to be updated by the storage manager 113.

In the example of FIG. 4, a storage system 1, a disk controller 1, VOL 1, and 500 kilobytes (KB)/second are respectively registered as the storage 401, the disk controller 402, the logical volume 403, and the data I/O amount 404 (line 411). This indicates that a path which reaches the VOL 1 through the disk controller 1 of the storage system 1 is set, and data I/O (i.e., writing or reading) is executed by 500 KB per second in the path.

Similarly, a path which reaches a VOL 2 through the disk controller 1 of the storage system 1 is set, and data I/O is executed by 300 KB per second in the path (line 412). A path which reaches a VOL 3 through a disk controller 2 of the storage system 1 is set, and data I/O is executed by 100 KB per second in the path (line 413). A path which reaches the VOL 1 through a disk controller 3 of the storage system 2 is set, and data I/O is executed by 100 KB per second in the path (line 414). A path which reaches the VOL 2 through the disk controller 3 of the storage system 2 is set, and data I/O is executed by 100 KB per second in the path (line 415).

FIG. 5 is an explanatory diagram of the host-storage connection information management table 204 according to the embodiment of this invention.

The host-storage connection information management table 204 includes a host 501, a storage 502, a disk controller 503, and an assigned volume 504.

In the host 501, information indicating the host 100 physically connected to each disk controller 131 is registered.

In the storage 502, information indicating the storage system 130 including the disk controller 131 physically connected to each host 100 is stored.

In the disk controller 503, information indicating the disk controller 131 physically connected to each host 100 is registered.

In the assigned volume 504, information indicating the logical volume 135 assigned to each disk controller 131, in other words, the logical volume 135 to which a path through each disk controller 131 is connected, is registered.

In the example of FIG. 5, a host 1, a storage system 1, and a disk controller 1 are respectively registered as the host 501, the storage 502, and the disk controller 503. Further, a VOL 1 and a VOL 2 are registered as corresponding assigned volumes 504 (line 511). This indicates that the host 1 is physically connected to the disk controller 1 of the storage system 1, and the VOL 1 and the VOL 2 are assigned to the disk controller 1. In other words, the host 1 can access the VOL 1 and the VOL 2 of the storage system 1 through the disk controller 1.

If no logical volume 135 is assigned to the disk controller 1 (in other words, there is no path through the disk controller 1), the assigned volume 504 becomes blank as nothing is registered.

Similarly, in the example of FIG. 5, the host 1 is physically connected to a disk controller 2 of the storage system 1, and a VOL 3 is assigned to the disk controller 2 (line 512). The host 1 is physically connected to a disk controller 3 of the storage system 2, and a VOL 1 and a VOL 2 are assigned to the disk controller 3 (line 513).

FIG. 6 is an explanatory diagram of the volume pair state management table 205 according to the embodiment of this invention.

In the volume pair state management table 205, one line corresponds to one logical volume 135 belonging to a pair of remote copy.

The remote copy is a technology of storing the same data in two logical volumes 135 by copying data stored in the logical volume 135 to the logical volume 135 in another storage system 130. As long as the two storage systems 130 that store the logical volumes 135 are geographically isolated from each other, even when data of one logical volume is lost due to a disaster or the like, the computer system can continue its operation by using the data of another logical volume 135.

The pair of remote copy means a group of a copy source logical volume 135 and a copy destination logical volume 135. Hereinafter, the copy source logical volume 135 will be referred to as a primary logical volume, and the copy destination logical volume 135 will be referred to as a secondary logical volume.

Normally, the host 100 issues an access request to the primary logical volume. To maintain data consistency, data writing from the host 100 in the secondary logical volume is inhibited.

The volume pair state management table 205 includes an ID 601, a storage 602, a logical volume 603, a primary/secondary 604, and a pair volume ID 605.

In the ID 601, an identifier given to identify a logical volume 135 belonging to a pair is registered.

In the storage 602, information indicating the storage system 130 that stores the logical volume 135 belonging to the pair is registered.

In the logical volume 603, information indicating the logical volume 135 belonging to the pair is registered.

In the primary/secondary 604, information indicating whether the logical volume 135 belonging to the pair is a primary logical volume or a secondary logical volume is registered.

In the pair volume ID 605, information indicating another logical volume 135 of the pair to which the logical volume 135 belongs is registered. Specifically, a value of an ID 601 corresponding to another logical volume 135 is registered. Hereinafter, when the logical volumes 135 belong to the pair, another logical volume 135 belonging to the pair will be referred to as a pair volume. In other words, the pair volume of the primary logical volume is a secondary logical volume of the pair to which the primary logical volume belongs, and the pair volume of the secondary logical volume is a primary logical volume of the pair to which the secondary logical volume belongs.

In the example of FIG. 6, 1, storage system 1, VOL 1, primary, and 2 are respectively registered as the ID 601, the storage 602, the logical volume 603, the primary/secondary 604, and the pair volume ID 605 (line 611). This means that the VOL 1 of the storage system 1 belongs to one pair, the VOL 1 in the pair is a primary logical volume, "1" is given as an ID 601 to the VOL 1, and an ID 601 given to anther logical volume 135 of the pair to which the VOL 1 belongs is "2".

Further, in the example of FIG. 6, 2, a storage system 2, a VOL 2, a sub, and 1 are respectively registered as the ID 601, the storage 602, the logical volume 603, the primary/secondary 604, and the pair volume ID 605 (line 612). This means that the VOL 2 of the storage system 2 belongs to one pair, the VOL 2 in the pair is a secondary logical volume, "2" is given as an ID 601 to the VOL 2, and an ID 601 given to another logical volume 135 of the pair to which the VOL 2 belongs is "1".

The lines 611 and 612 after all mean that the VOL 1 of the storage system 1 and the VOL 2 of the storage system 2 form a pair, and the VOL 1 is a primary logical volume and the VOL 2 is a secondary logical volume in the pair. In this case, the host 100 issues an access request to the VOL 1 alone, and data of the VOL 1 is copied to the VOL 2. Writing of data from the host 100 in the VOL 2 is inhibited.

Next, processing executed by the switching controller 201 of the embodiment will be described.

As described above, the switching controller 201 is a program executed by the CPU 111. Thus, in the description below, the processing executed by the switching controller 201 is actually executed by the CPU 111.

First, assignment of the logical volume 135 to the disk controller 131 that is an assumption for each processing will be described.

FIGS. 7A and 7B are explanatory diagrams showing assignment processing of the logical volume 135 to the disk controller 131 according to the embodiment of this invention.

FIGS. 7A and 7B show one host 100 and one storage system 130 alone among the components of the computer system of FIG. 1. Portions among the components of FIG. 1 unnecessary for explanation of the assignment processing are not shown in FIGS. 7A and 7B.

FIG. 7A shows a storage system 130 before a logical volume 135 is assigned to the disk controller 131. In this case, as there is no path set from the host 100 to the VOL 1, the host 100 cannot access the VOL 1 even through the disk controllers 1 and 2.

FIG. 7B shows a storage system 130 after a logical volume 135 is assigned to the disk controller 131. In the example of FIG. 7B, a VOL 1 is assigned to both of the disk controllers 1 and 2. In this case, there are paths set from the host 100 through the disk controller 1 to the VOL 1 and from the host 100 through the disk controller 2 to the VOL 1. Thus, the host 1 can access the VOL 1 through both of the disk controllers 1 and 2.

Each of FIGS. 7A and 7B shows the example of assigning the VOL 1 to both of the disk controllers 1 and 2. However, the VOL 1 may be assigned to only one of the disk controllers 1 and 2.

Figure 8:
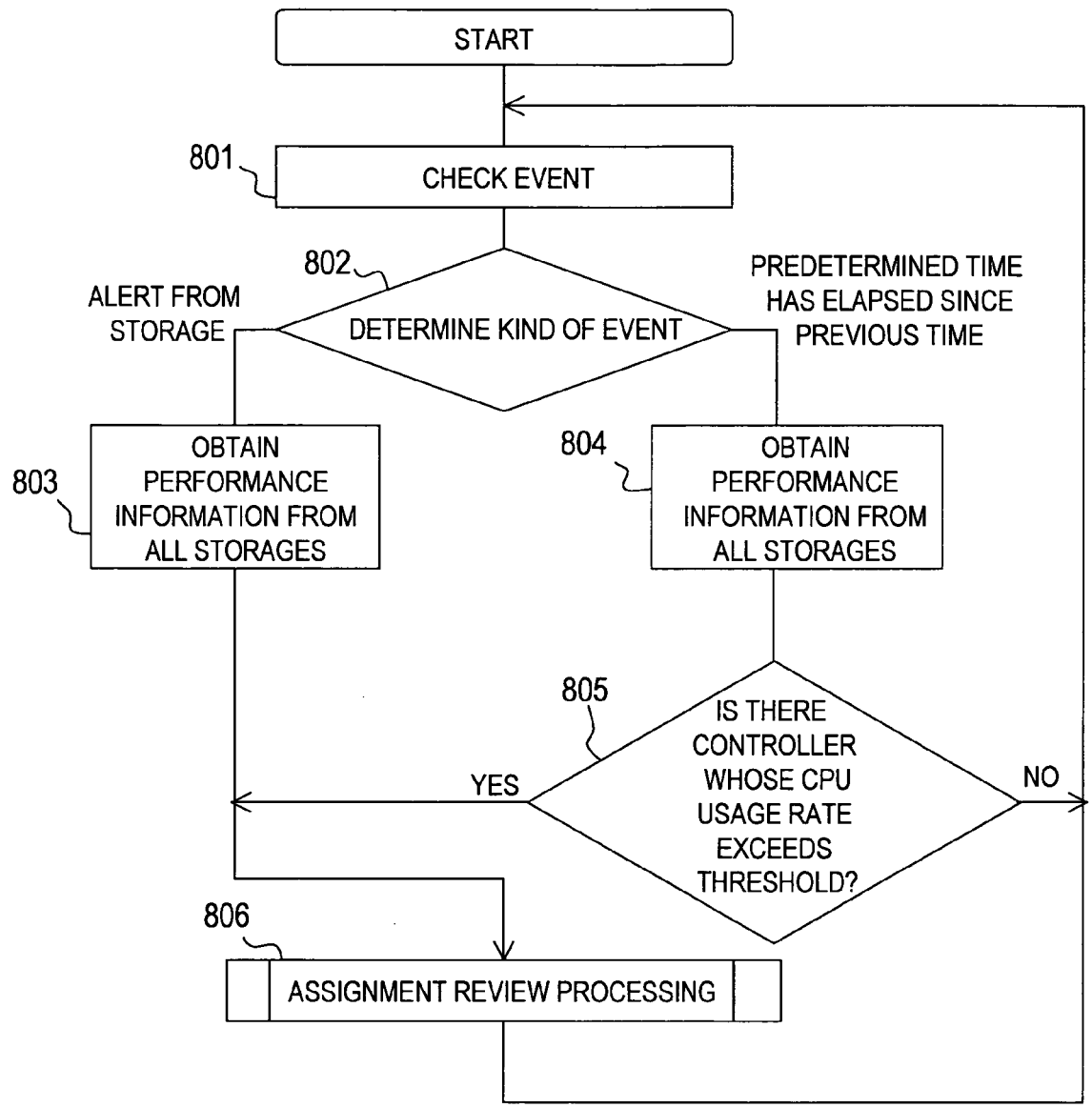
FIG. 8 is a flowchart of assignment review execution determination processing executed by a switching controller according to the embodiment of this invention.

FIG. 8 is a flowchart showing assignment review execution determination processing executed by the switching controller 201 according to the embodiment of this invention.

The assignment review execution determination processing is for checking a generated event to determine whether to review assignment of the logical volume 135 to the disk controller 131 (specifically, whether to execute assignment review processing described below). According to the embodiment, an event that triggers assignment review is reception of an alert from the storage system 130, or a passage of predetermined time from previous review.

For example, the storage controller 137 of the storage system 130 measures a CPU usage rate in each disk controller 131. When a CPU usage rate in one of the disk controllers 131 exceeds a predetermined threshold, the storage controller 137 may transmit an alert to the management server 110 through the IP network 150. On the other hand, the management server 110 may include a timer (not shown). The timer may measure a passage of time after assignment review, and may notify the passage of predetermined time to the switching controller 201 when the passage of time exceeds a predetermined threshold.

In the description below, when the management server 110 transmits/receives an instruction, data, or the like to/from the host 100 or the storage system 130, the transmission/reception is executed through the network I/F 114 and the IP network 150. The same holds true for processing of FIG. 9 and after.

The switching controller 201 first checks an event (801).

Next, the switching controller 201 determines a type of the event (802). Specifically, the switching controller 201 determines whether the event is an alert transmitted from the storage system 130 or a passage of predetermined time from previous review.

When it is determined in the step 802 that the event is the alert from the storage system 130, a CPU usage rate in one of the disk controllers 131 exceeds a predetermined threshold. In this case, access loads may be concentrated in the disk controller 131. There is a possibility that performance (e.g., response time to a write/read request) will be improved by balancing the access loads. In such a case, the switching controller 201 obtains performance information from all the storage systems 130 (803). Specifically, the switching controller 201 refers to controller performance information 140 stored in the memory 139 of each storage controller 137 to obtain a CPU usage rate of each CPU 132. Then, the switching controller 201 registers the obtained CPU rate as a CPU rate 303 in the performance information table 202.

Next, the switching controller 201 executes assignment review processing (806). The assignment review processing will be described below in detail by referring to FIG. 9.

The switching controller 201 returns to the step 801 to check a next event after the execution of the assignment review processing in the step 806.

On the other hand, when it is determined in the step 802 that the event is the passage of predetermined time, even if access loads have properly been balanced at the execution time of previous assignment review processing, there is a possibility that the access loads will be unevenly balanced while a predetermined time passes thereafter. Accordingly, the switching controller 201 determines whether it is necessary or not to execute assignment review processing.

Specifically, the switching controller 201 obtains performance information from all the storage systems 130 (804). The processing of the step 804 is similar to that of the step 803.

Next, the switching controller 201 refers to the performance information management table 202 to determine whether a CPU usage rate 303 corresponding to one of the disk controllers 302 exceeds a predetermined threshold or not (805).

When it is determined in the step 805 that the CPU usage rate 303 corresponding to one of the disk controllers 302 does not exceed the predetermined threshold, access loads have properly been balanced and thus it is not necessary to execute assignment review processing. In this case, the switching controller 201 returns to the step 801 to check a next event.

On the other hand, when it is determined in the step 805 that the CPU usage rate 303 corresponding to one of the disk controllers 302 exceeds the predetermined threshold, access loads may be concentrated in the disk controller 131 indicated by the disk controller 302. In this case, there is a possibility that performance will be improved by balancing the access loads. Hence, the switching controller 201 executes assignment review processing (806), and then returns to the step 801.

Figure 9:
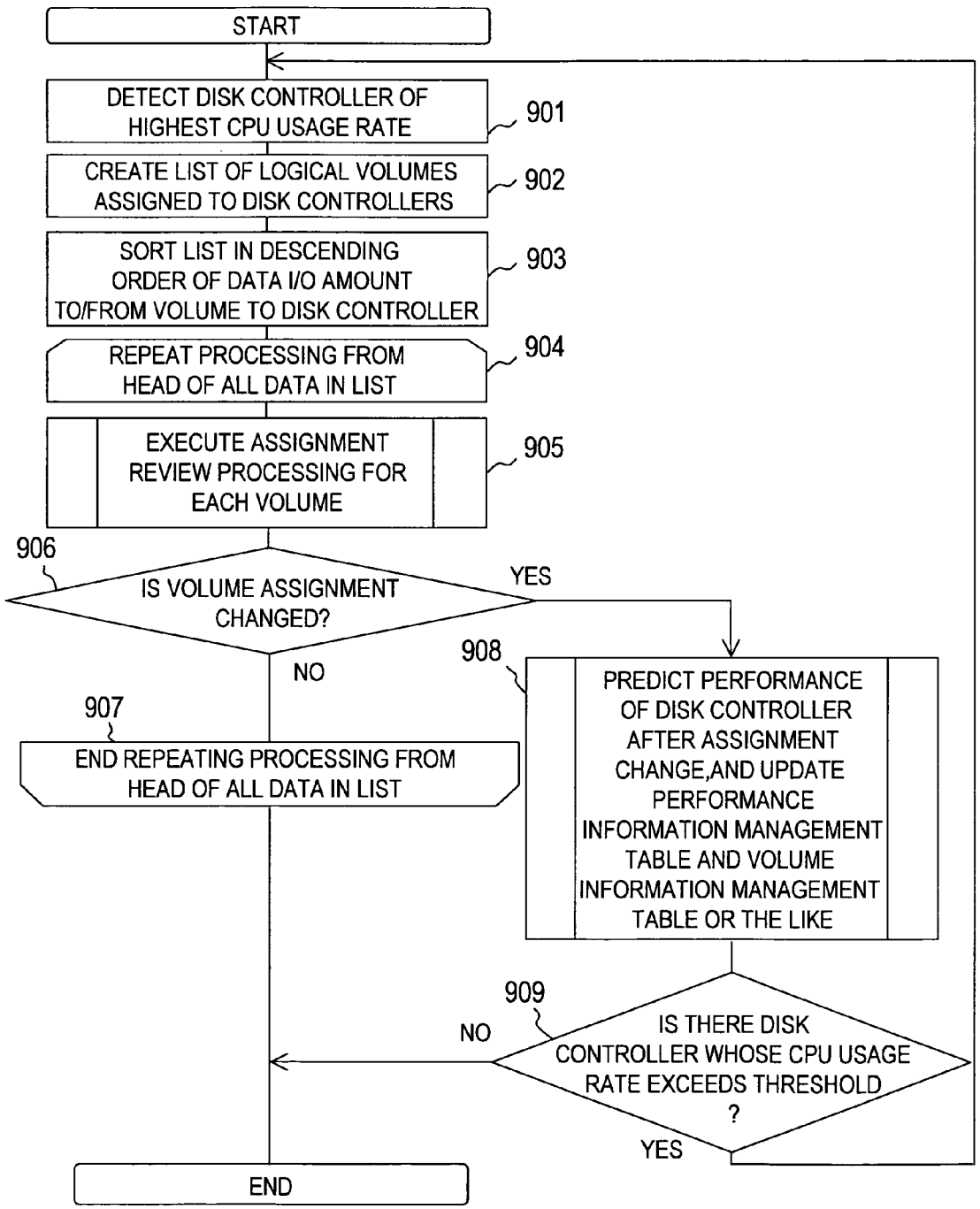
FIG. 9 is a flowchart of assignment review processing executed by the switching controller according to the embodiment of this invention.

FIG. 9 is a flowchart showing assignment review processing executed by the switching controller 201 according to the embodiment of this invention.

The assignment review processing is executed by the switching controller 201 in the step 806 of the assignment review execution determination processing as shown in FIG. 8.

The switching controller 201 first refers to the performance information management table 202 to detect a disk controller 131 of a highest CPU usage rate (901).

Next, the switching controller 201 refers to the host-storage connection information management table 204 to create a list (not shown) of logical volumes 135 assigned to the disk controller 131 detected in the step 901 (902).

Next, the switching controller 201 refers to the volume information management table 203 to sort the logical volumes 135 registered in the list in descending order of data I/O amount 404 with respect to the detected disk controller 131.

Next, the switching controller 201 targets a first logical volume 135 of the list (904) to execute assignment review processing for each volume (905). The assignment review processing for each volume will be described below in detail by referring to FIG. 10.

Next, the switching controller 201 refers to a return value of the assignment review processing for each volume to determine whether the assignment of the logical volume 135 has been changed or not (906).

When it is determined in the step 906 that the assignment of the logical volume 135 has not been changed, switching controller 201 executes assignment review processing for each volume by targeting a next logical volume 135 of the list (907, 904, and 905). Upon an end of assignment review processing for each volume by targeting a last logical volume 135 of the list, the assignment review processing is finished.

On the other hand, when it is determined in the step 906 that the assignment of the logical volume 135 has been changed, the switching controller 201 predicts performance of each disk controller after the assignment change, and updates the performance information management table 202 and the volume information management table 203 based on a result of the prediction (step 908). Further, the switching controller 201 updates the host storage connection information table 204 according to the changed assignment. When pair switching processing described below is executed, the switching controller 201 additionally updates the volume pair state management table 205.

Next, the switching controller 201 refers to the updated performance information management table 202 to determine whether there is a disk controller 131 whose CPU usage rate 303 exceeds a predetermined threshold (909).

When it is determined in the step 909 that there is a disk controller 131 whose CPU usage rate 303 exceeds the predetermined threshold, uneven balancing of access loads is not eliminated. Thus, the process returns to the step 901 to execute the assignment review processing again.

On the other hand, when it is determined in the step 909 that there is no disk controller 131 whose CPU usage rate 303 exceeds the predetermined threshold, access loads have properly been balanced as a result of removing uneven balancing of the access loads. In this case, the assignment review processing is finished.

Next, a specific example of assignment review processing will be described.

For example, when the performance information management table 202 is as shown in FIG. 3, in the step 901, a disk controller 1 having a highest CPU usage rate 303 of "80%" is detected.

Next, in the step 902, reference is made to the disk controller 503 and the assigned volume 504 of the host-storage connection information management table 204. Then, a list of a VOL 1 and a VOL 2 assigned to the disk controller 1 is created.

Next, in the step 903, reference is made to the logical volume 403 and the data I/O amount 404 of the volume information management table 203. Then, a VOL 1 having a data I/O amount 404 set to "500 KB" is arranged first in the list, and a VOL 2 having a data I/O volume 404 set to "300 KB" is arranged after the VOL 1.

Next, in the step 905, assignment review processing for each volume is executed by targeting the VOL 1.

For example, when the VOL 1 assigned to the disk controller 1 is assigned to the disk controller 2 as a result of the assignment change in the step 905, performance of the disk controllers 1 and 2 is predicted (908). Specifically, a CPU usage rate 303 of the CPU 132 of each of the disk controllers 1 and 2 is predicted.

Further, in the step 908, the performance information management table 202, the volume information management table 203, and the like are updated.

In step 909, reference is made to the updated performance information management table 202 to determine whether a CPU usage rate 303 exceeds a threshold or not.

Figure 10:
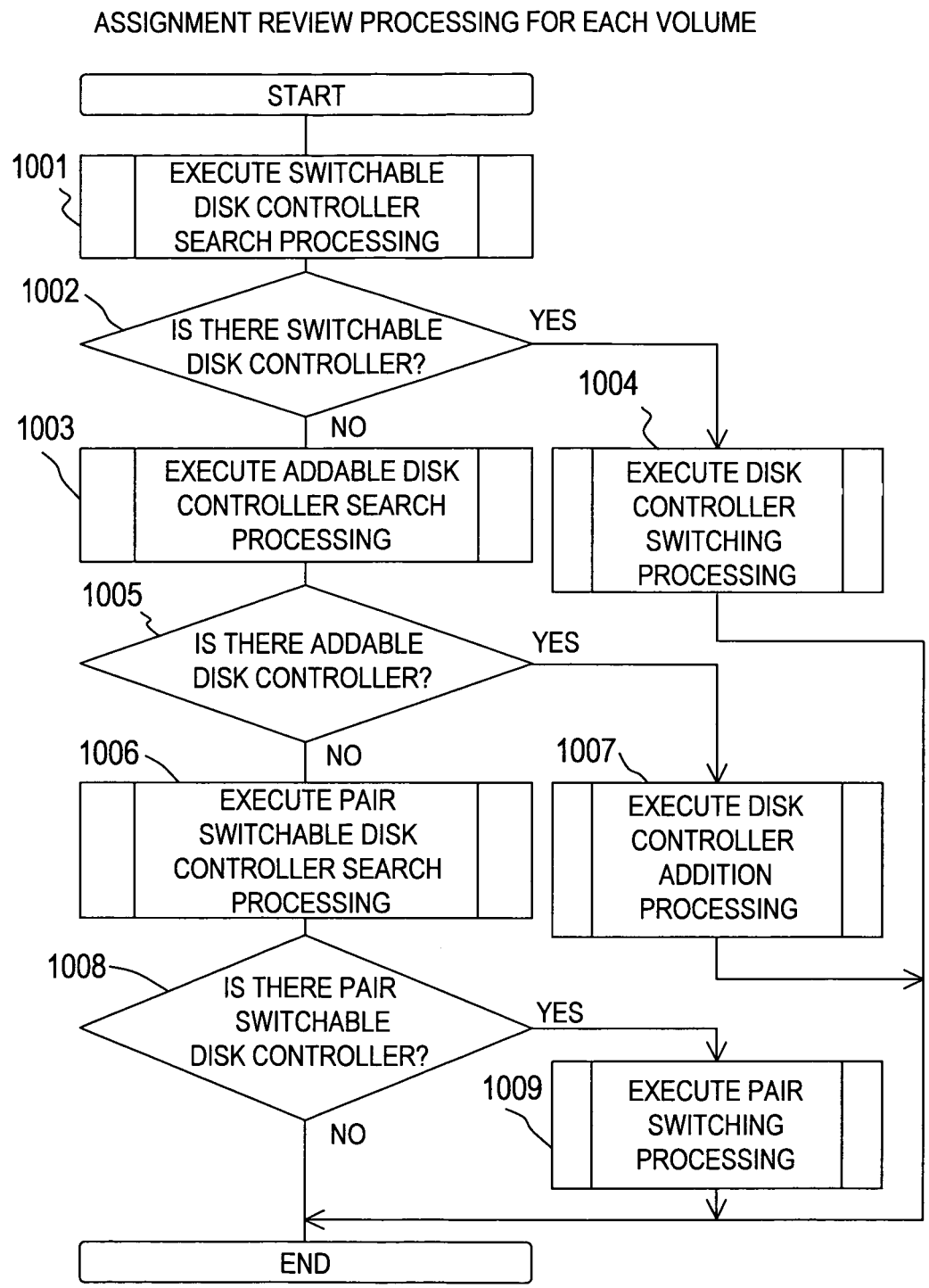
FIG. 10 is a flowchart of assignment review processing of each volume executed by the switching controller according to the embodiment of this invention.

FIG. 10 is a flowchart showing assignment review processing for each volume executed by the switching controller 201 according to the embodiment of this invention.

The assignment review processing for each volume is executed by the switching controller 201 in the step 905 of the assignment review processing as shown in FIG. 9.

The switching controller 201 first executes switchable disk controller search processing (1001).

The switching of the disk controller 131 means that when there is a logical volume 135 assigned to the disk controller 131, the assignment is released to assign the logical volume 135 to another new disk controller 131. For example, "switching of VOL 1 to disk controller 2" means that the assignment of the VOL 1 to the other disk controller 131 is released to assign the VOL 1 to the disk controller 2. The switchable disk controller search processing is for searching a switchable disk controller 131, i.e., a disk controller 131 to which the logical volume 135 can be newly assigned by switching. The switchable disk controller search processing will be described below in detail by referring to FIG. 11.

Next, the switching controller 201 refers to a return value of the switchable disk controller search processing to determine whether there is a switchable disk controller 131 (1002).

When it is determined in the step 1002 that there is a switchable disk controller 131, the switching controller 201 executes disk controller switching processing (1004) and finish the assignment review processing for each volume. The disk controller switching processing is for switching the logical volume 135 to the switchable disk controller 131. The disk controller switching processing will be described below in detail by referring to FIGS. 14, and 15A and 15B.

On the other hand, when it is determined in the step 1002 that there is no switchable disk controller 131, the switching controller 201 executes addable disk controller search processing (1003).

The addition of the disk controller 131 means that when there is a logical volume 135 assigned to the disk controller 131, the logical volume 135 is further assigned to another disk controller 131 while maintaining the assignment. The addable disk controller search processing is for searching a disk controller 131 to be added, i.e., a disk controller 131 to which the logical volume 135 can be assigned by addition. The addable disk controller search processing will be described below in detail by referring to FIG. 12.

Next, the switching controller 201 refers to a return value of the addable disk controller search processing to determine whether there is an addable disk controller 131 (1005).

When it is determined in the step 1005 that there is an addable disk controller 131, the switching controller 201 executes disk controller addition processing (1007) and finish the assignment review processing for each volume. The disk controller addition processing is for adding the logical volume to the addable disk controller 131. The disk controller addition processing will be described below in detail by referring to FIGS. 16, and 17A and 17B.

On the other hand, when it is determined in the step 1005 that there is no disk controller 131 to be added, the switching controller 201 executes pair switchable disk controller search processing (1006).

The pair switching means that when logical volumes 135 belong to a pair, a primary logical volume of the pair is changed to a secondary logical volume, and a secondary logical volume is changed to a primary logical volume. The pair switchable disk controller search processing is for searching a pair switchable disk controller 131, i.e., a disk controller 131 to which logical volumes 135 belonging to a switchable pair are assigned. The pair switchable disk controller search processing will be described below in detail by referring to FIG. 13.

Next, the switching controller 201 refers to a return value of the pair switchable disk controller search processing to determine whether there is a pair switchable disk controller 131 (1008).

Figure 18:
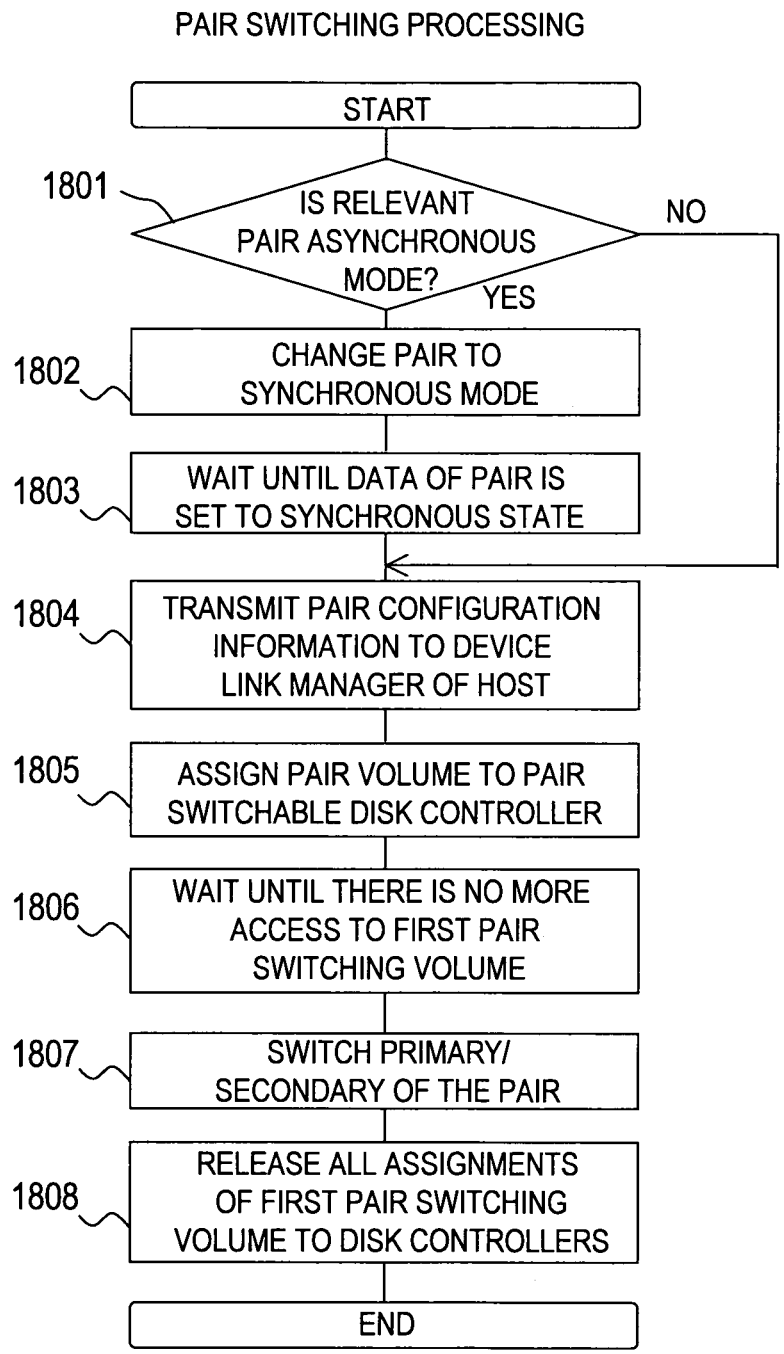
FIG. 18 is a flowchart of pair switching processing executed by the switching controller according to the embodiment of this invention.
Figures 19A, 19B:
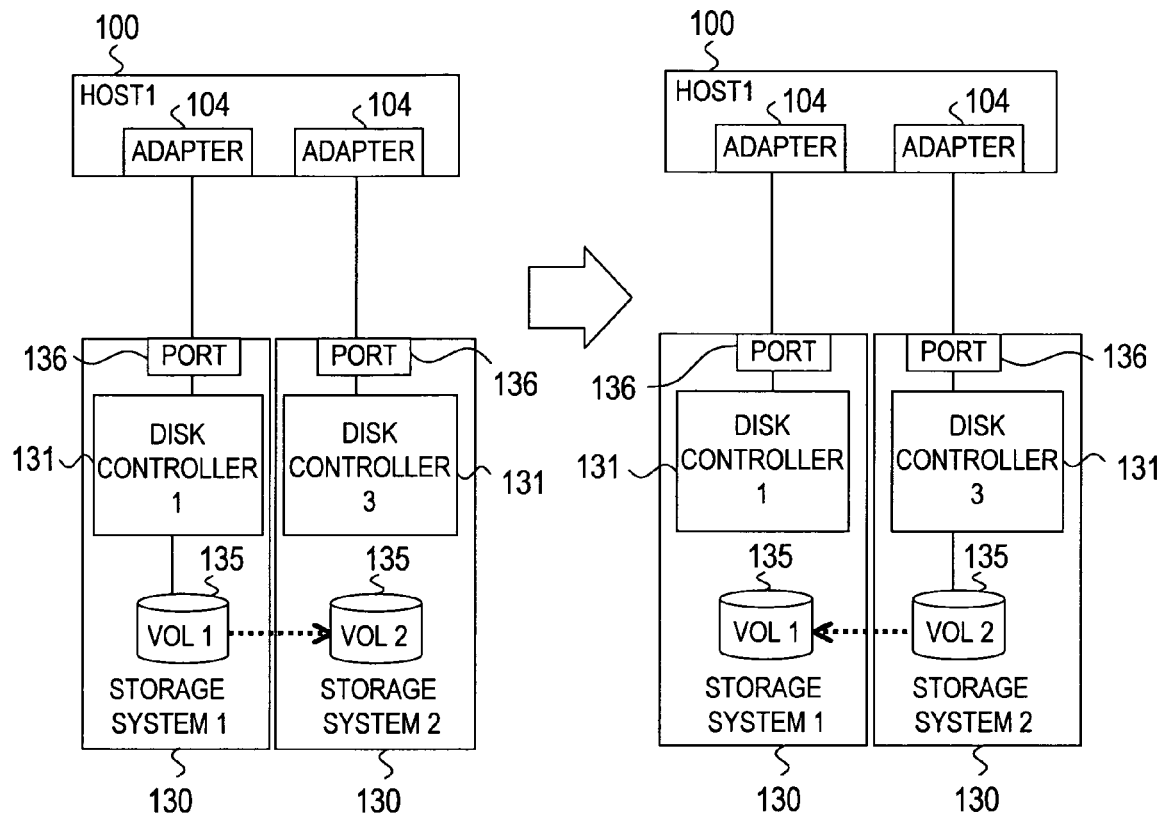
FIGS. 19A and 19B are explanatory diagrams each showing a specific example of pair switching processing according to the embodiment of this invention.

When it is determined in the step 1008 that there is a pair switchable disk controller 131, the switching controller 201 executes pair switching processing (1009) and finish the assignment review processing for each volume. The pair switching processing will be described below in detail as shown in FIGS. 18, and 19A and 19B.

On the other hand, when it is determined in the step 1008 that when there is no pair switchable disk controller 131, the switching controller 201 finishes the assignment review processing for each volume. In this case, a return value of the assignment review processing for each volume indicates that there has been no change in assignment of the logical volume 135.

On the other hand, when the assignment review processing is finished after the execution of the processing of the step 1004, 1007 or 1009, a return value indicates that there has been a change in assignment of the logical volume 135.

Figure 11:
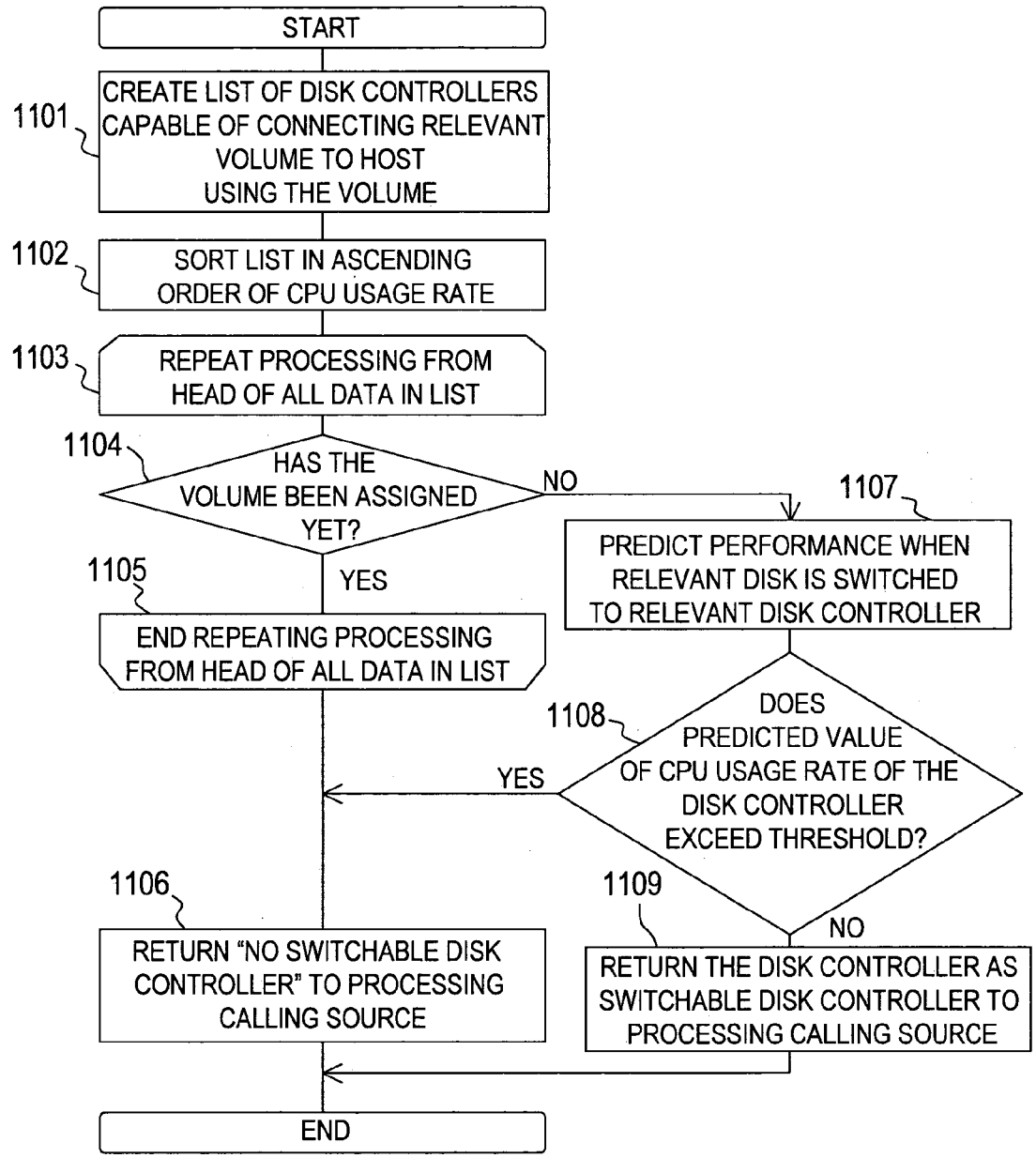
FIG. 11 is a flowchart of switchable disk controller search processing executed by the switching controller according to the embodiment of this invention.

FIG. 11 is a flowchart showing switchable disk controller search processing executed by the switching controller 201 according to the embodiment of this invention.

The switchable disk controller search processing is called by the switching controller 201 to be executed in step 1001 of assignment review processing for each volume as shown in FIG. 10. The assignment review processing for each volume is executed in the step 905 of the assignment review processing as shown in FIG. 9. The logical volume 135 targeted to be processed in the step 905 will be referred to as "relevant logical volume 135" in description of FIG. 11.

The switching controller 201 first refers to the host-storage connection information management table 204 to create a list of disk controllers 131 connectable to the relevant logical volume 135, and to all the hosts 100 that use the relevant logical volume 135 (1101).

Next, the switching controller 201 refers to the performance information management table 202 to sort the disk controllers 131 of the created list in ascending order of CPU usage rates 303 (1102).

Next, the switching controller 201 targets a first disk controller 131 in the created list (1103) to determine whether the relevant logical volume 135 has been assigned to the target disk controller 131 (1104). During the determination of the step 1104, the switching controller 201 refers to the host-storage connection information management table 204. The target disk controller 131 of this determination will be referred to as "relevant disk controller 131" in the description of FIG. 11.

When it is determined in the step 1104 that the relevant logical volume 135 has been assigned to the relevant disk controller 131, the relevant logical volume 135 cannot be further applied to the relevant disk controller 131. In other words, the relevant logical volume 135 cannot be switched to the relevant disk controller 131. In this case, the switching controller 201 executes determination of the step 1104 by targeting a next disk controller 131 in the list (1103 to 1105).

Upon an end of determination of the step 1104 targeting a last disk controller 131 in the list, the switching controller 201 returns nonpresence of a switchable disk controller 131 to the calling side of the switchable disk controller search processing (1106) and finish The retrieval processing. In other words, in this case, a return value of the switchable disk controller search processing indicates that there is no switchable disk controller 131.

On the other hand, when it is determined in the step 1104 that the relevant logical volume 135 has not been assigned to the relevant disk controller 131, the relevant logical volume 135 can be switched to the relevant disk controller 131. However, switching cannot be carried out if access loads are not balanced. Hence, the switching controller 201 predicts a CPU usage rate 303 when the relevant logical volume 135 is switched to the relevant disk controller 131 (1107). This prediction may be executed as in the case of the step 908 of FIG. 9.

Next, the switching controller 201 determines whether the CPU usage rate 303 predicted for the relevant disk controller 131 exceeds a predetermined threshold or not (1108).

When it is determined in the step 1108 that the predicted value of the CPU usage rate 303 exceeds the predetermined threshold, it is predicted that access loads will not be balanced even if the relevant logical volume 135 is switched to the relevant disk controller 131. Thus, the relevant logical volume 135 cannot be switched to the relevant disk controller 131.

At this time, there may still be disk controllers 131 untargeted for determination of the step 1104 in the list. In the step 1102, however, the disk controllers 131 of the list are arranged in ascending order of CPU usage rates 303. Hence, when the access loads are not balanced in the step 1108, it is predicted that the access loads will not be balanced even if the relevant logical volume 135 is switched to the remaining disk controller 131. Thus, the switching controller 201 returns nonpresence of a switchable disk controller 131 to the calling side of the switchable disk controller search processing (1106) and finish the processing.

On the other hand, when it is determined in the step 1108 that the predicted value of the CPU usage rate 303 does not exceed the predetermined threshold, it is predicted that the access loads will be balanced by switching the relevant logical volume 135 to the disk controller 131. Hence, the switching controller 201 returns a message that the relevant disk controller 131 is a switchable disk controller to the calling side of the switchable disk controller search processing (1109) and finish the search processing. In other words, in this case, a return value of the switchable disk controller search processing indicates that the relevant disk controller 131 is a switchable disk controller.

In such a case, the predicted CPU usage rate 303 is registered in the performance information management table 202 in the step 908 of FIG. 9.

Now, a specific example of switchable disk controller search processing will be described.

In the step 905 of FIG. 9, when the VOL 1 of the storage system 1 is a target of processing, the VOL 1 is a relevant logical volume 135.

In this case, the switching controller 201 refers to the host storage connection information table 204 (1101). As a result, the VOL 1 of the storage system 1 is used by the host 1. The storage system 1 includes disk controllers 1 and 2. The disk controller 2 is physically connected to the host 1. Accordingly, the switching controller 201 creates a list of disk controllers 1 and 2 connectable to the host 1 and the VOL 1.

Next, the switching controller 201 refers to the performance information management table 202 (1102). As a CPU usage rate 303 "10%" of the disk controller 2 is lower than a CPU usage rate 303 "80%" of the disk controller 1, the disk controller 2 is a first in the list.

The disk controller 2 has not been assigned to the VOL 1 (1104), the switching controller 201 predicts a CPU usage rate 303 of the disk controller 2 when the VOL 1 is switched to the disk controller 2 (1107).

When the predicted CPU usage rate 303 exceeds a predetermined threshold (1108), the switching controller 201 returns nonpresence of a switchable disk controller 131 (1106).

On the other hand, when the predicted CPU usage rate 303 does not exceed the predetermined threshold (1108), the switching controller 201 returns a message that the VOL 1 can be switched to the disk controller 2 (1109). In this case, the predicted CPU usage rate 303 is registered in a line 312 of the performance information management table 202 in the step 908 of FIG. 9.

Figure 12:
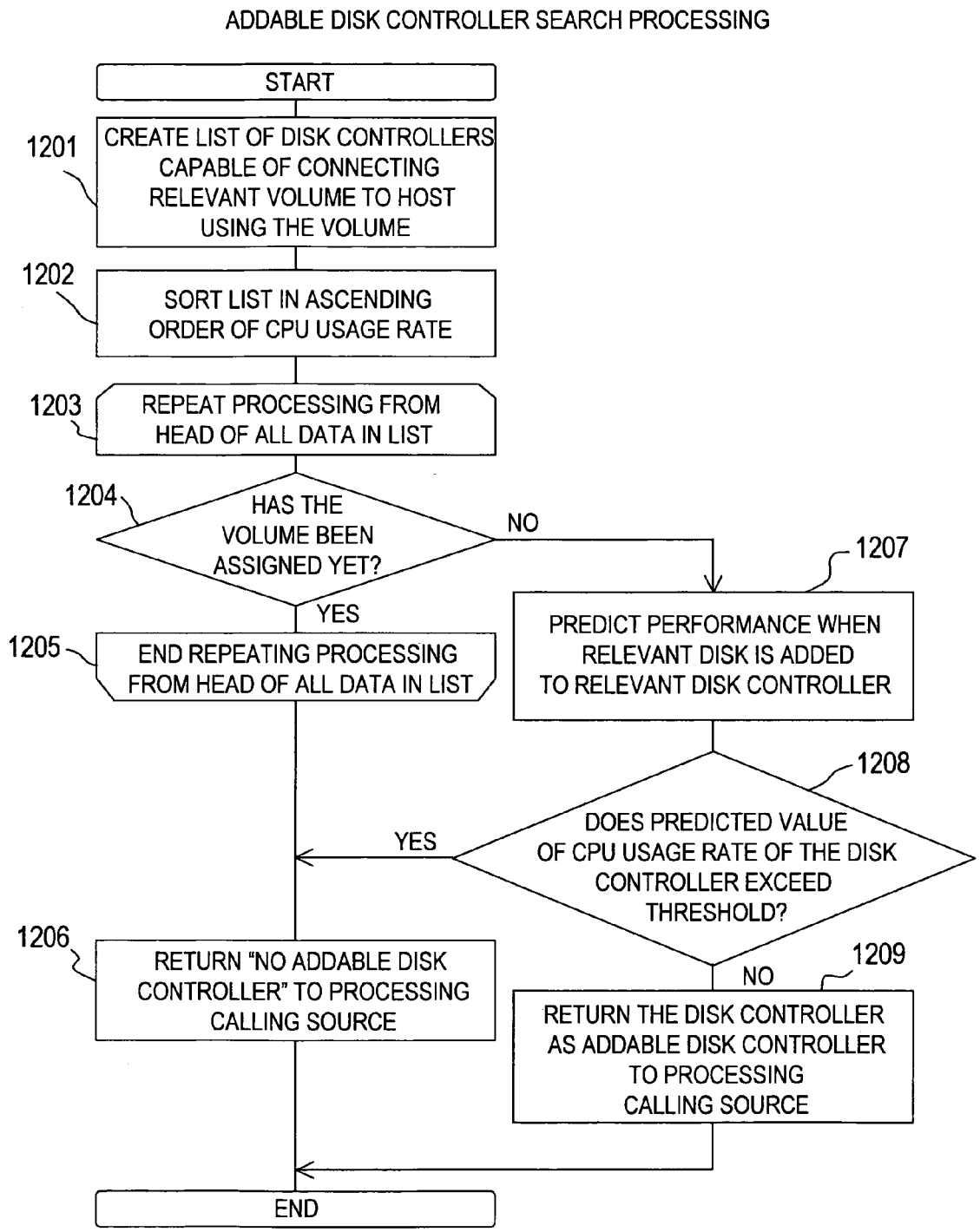
FIG. 12 is a flowchart of addable disk controller search processing executed by the switching controller according to the embodiment of this invention.

FIG. 12 is a flowchart showing addable disk controller search processing executed by the switching controller 201 according to the embodiment of this invention.

The addable disk controller search processing is called by the switching controller 201 to be executed in step 1003 of assignment review processing for each volume as shown in FIG. 10.

As shown in FIG. 12, in the addable disk controller search processing, processing from step 1201 to step 1209 is executed. This processing is similar to that from the step 1101 to the step 1109.

However, in the step 1207, the switching controller 201 predicts a CPU usage rate 303 when a relevant logical volume 135 is added to a relevant disk controller 131. This prediction is executed as in the case of the step 1107.

In the step 1206, the switching controller 201 returns nonpresence of an addable disk controller 131 to the loading side.

In the step 1206, the switching controller 201 returns a message that the relevant disk controller 131 is an addable disk controller to the loading side.

Processing executed in the other steps is similar to that of FIG. 11, and thus description thereof will be omitted.

Figure 13:
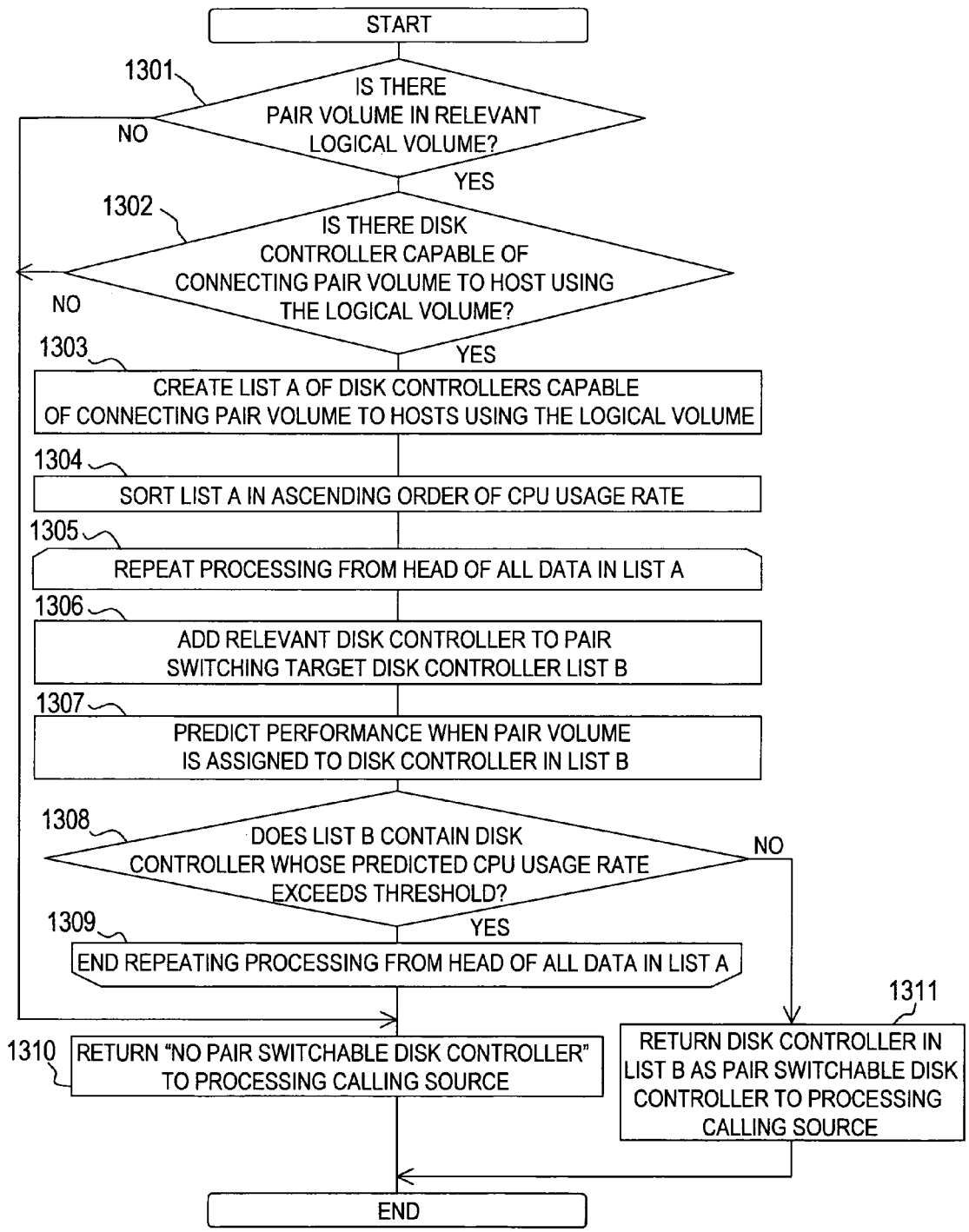
FIG. 13 is a flowchart of pair switchable disk controller search processing executed by the switching controller according to the embodiment of this invention.

FIG. 13 is a flowchart showing pair switchable disk controller search processing executed by the switching controller 201 according to the embodiment of this invention.

The pair switchable disk controller search processing is called to be executed by the switching controller 201 in the step 1006 of assignment review processing for each volume as shown in FIG. 10.

In the description of FIG. 13, as in the case of FIG. 11, a logical volume 135 of a processing target will be referred to as a relevant logical volume 135.

The switching controller 201 first determines whether there is a pair volume in the relevant logical volume 135 (in other words, whether the relevant logical volume 135 belongs to a pair of remote copy or not) (1301).

When it is determined in the step 1301 that there is no pair volume, the relevant logical volume 135 does not belong to the pair. Thus, pair switching cannot be executed for the relevant logical volume 135. Accordingly, the switching controller 201 returns nonpresence of a pair switchable disk controller 131 to the calling side of the pair switchable disk controller search processing (1310) and finish the processing. In other words, in this case, a return value of the pair switchable disk controller search processing indicates that there is no pair switchable disk controller 131.

On the other hand, when it is determined in the step 1301 that there is a pair volume, the relevant logical volume 135 belongs to a pair. In this case, the switching controller 201 determines whether there is a disk controller 131 capable of connecting the host 100 using the relevant logical volume 135 to the pair volume of the relevant logical volume 135 (1302). Specifically, the switching controller 201 refers to the host-storage connection information management table 204 to determine which of the disk controllers 131 of the storage system 130 having the pair volume stored therein is physically connected to the host 100 using the relevant logical volume 135.

When it is determined in the step 1302 that there is no relevant disk controller 131, the host 100 that uses the relevant logical volume 135 cannot access the pair volume of the relevant logical volume 135, and thus pair switching cannot be executed. Accordingly, the switching controller 201 executes step 1310 and finish the processing.

On the other hand, when it is determined in the step 1302 that there is a relevant disk controller 131, the host 100 using the relevant logical volume 135 can access the pair volume of the relevant logical volume 135. In this case, the switching controller 201 creates a list (not shown) of disk controllers 131 capable of connecting the host 100 using the relevant logical volume 135 to the pair volume of the relevant logical volume 135 (1303). In the description of FIG. 13, this list will be referred to as "a pair switching candidate disk controller list". In FIG. 13, the pair switching candidate disk controller list is shown as "list A".

Next, the switching controller 201 sorts disk controllers 131 included in the pair switching candidate disk controller list in ascending order of CPU usage rates 303 (1304).

Next, the switching controller 201 executes a loop from step 1305 to 1309 sequentially by targeting first to last disk controllers 131 in the pair switching candidate disk controller list.

First, the switching controller 201 registers the first disk controller 131 in the pair switching candidate disk controller list in a pair switching target disk controller list (not shown) (1306). In FIG. 13, the pair switching target disk controllers is shown as "list B".

Next, the switching controller 201 predicts a CPU usage rate of the disk controller 131 when a pair disk is assigned to the disk controller 131 registered in the pair switching, target disk controller list (1307). When there are a plurality of disk controllers 131 registered in the pair switching target disk controller list, CPU usage rates of the disk controllers 131, are predicted. This prediction may be carried out as in the case of the step 908 of FIG. 9.

Next, the switching controller 201 determines whether there is a controller whose predicted CPU usage rate exceeds a predetermined threshold among the disk controllers 131 registered in the pair switching target disk controller list (1308).

When it is determined in the step 1308 that there is a disk controller 131 whose predicted CPU usage rate exceeds the predetermined threshold, access loads are not balanced by pair switching. In this case, the switching controller 201 adds a next disk controller 131 registered in the pair switching candidate disk controller list to the pair switching target disk controller list (1306) to execute the steps 1307 and 1308.

On the other hand, when it is determined in the step 1308 that there is no disk controller 131 whose predicted CPU usage rate exceeds the predetermined threshold, access loads are balanced by pair switching. In this case, the switching controller 201 returns the disk controller 131 registered in the pair switching target disk controller list as a pair switchable disk controller 131 to the loading side (1311). In other words, in this case, a return value of the pair switchable disk controller search processing indicates that the disk controller 131 registered in the pair switching target disk controller list is a pair switchable disk controller 131.

In this case, the predicted CPU usage rate 303 is registered in the performance information management table 202 in the step 908 of FIG. 9.

Now, a specific example of a pair switchable disk controller search processing will be described.

An example of executing pair switchable disk controller search processing by setting the VOL 1 as a relevant logical volume 135 when the VOL 1 of storage system 1 and the VOL 2 of the storage system 2 make a pair as shown in FIG. 6 will be described. In an initial state of this example, the VOL 2 of the storage system 2 is not assigned to the disk controller 3.

There is a VOL 2 of a storage system 2 which is a pair volume of the VOL 1 of the storage system 1 (1301). In other words, the VOL 1 belongs to the pair.

The VOL 1 of the storage system 1 is used by the host 1. On the other hand, the disk controller 3 included in the storage system 2 is physically connected to the host 1 as shown in FIG. 5 (1302). In other words, the disk controller 3 can be connected to both of the host 1 and the VOL 2 which is a pair volume.

In this example, the pair switching candidate disk controller list includes only the disk controller 3 (1303 to 1306).

Next, the switching controller 201 predicts a CPU usage rate of the disk controller 3 when the VOL 2 is assigned thereto (1307). As a result, when the predicted CPU usage rate does not exceed a predetermined threshold (1308), the switching controller 201 returns a message that the disk controller 3 is a pair switchable disk controller 131 to the calling side (1311) and finish the processing. In this case, the predicted CPU usage rate 303 is registered in a line 313 of the performance information management table 202 in the step 908 of FIG. 9.

Figure 14:
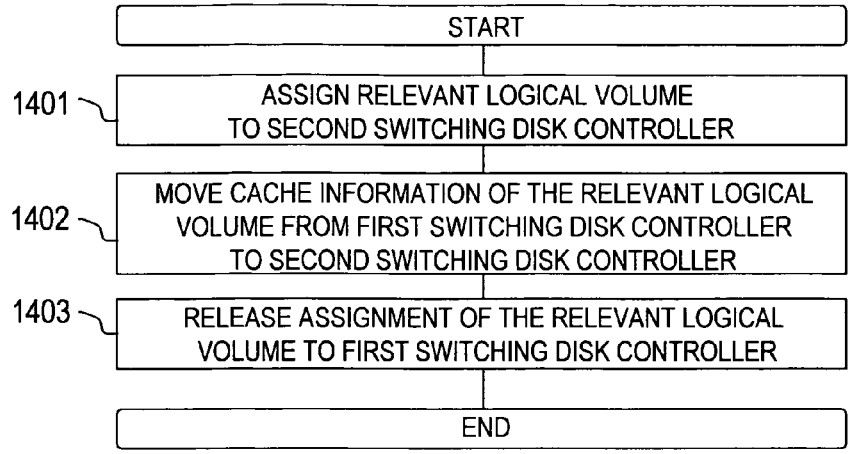
FIG. 14 is a flowchart of disk controller switching processing executed by the switching controller according to the embodiment of this invention.

FIG. 14 is a flowchart showing disk controller switching processing executed by the switching controller 201 according to the embodiment of this invention.

The disk controller switching processing is executed by the switching controller 201 in the step 1004 of the assignment review processing for each volume as shown in FIG. 10.

In the description of FIG. 14, as in the case of FIG. 11, a logical volume 135 of a processing target will be referred to as a relevant logical volume 135. A disk controller 131 to which the relevant logical volume 135 has been assigned at a point of time of starting disk controller switching processing will be referred to as a first switching disk controller 131. Further, a switchable disk controller 131 at a point of the time will be referred to as a second switching disk controller 131.

The switching controller 201 first assigns the relevant logical volume 131 to a second switching disk controller 131 (1401). At this time, the switching controller 201 may transmit an instruction of storing assignment information for correlating the relevant logical volume 131 with the second switching disk controller 131 to the storage system 130. Further, the host-storage connection information management table 204 is updated according to this assignment information in the step 908 of FIG. 9.

Next, switching controller 201 copies data regarding the relevant logical volume 135 among data stored in the cache memory 134 of the first switching disk controller 131 in the cache memory 134 of the second switching disk controller 131 (1402). Specifically, the switching controller 201 transmits an instruction of copying the data to the storage system 130.

The data regarding the relevant logical volume 135 is at least one of data read from the relevant logical volume 135 and data to be written therein. For example, when data (e.g., pre-read data) read from the relevant logical volume 135 has been stored in the cache memory 134 of the first switching disk controller 131, it is possible to realize high-speed accessing even after execution of switching by copying the data in the cache memory 134 of the second switching disk controller 131.

After the end of the copying, the copied data may be deleted from the cache memory 134 of the first switching disk controller 131.

Next, the switching controller 201 releases the assignment of the relevant logical volume 135 and the first switching disk controller 131 (1403). At this time, the switching controller 201 may transmit an instruction of deleting assignment information for correlating the relevant logical volume 131 with the first switching disk controller 131 to the storage system 130. Further, the host-storage connection information management table 204 is updated according to the releasing of the assignment in the step 908 of FIG. 9.

The device link manager 103 of the host 100 refers to the updated assignment information to recognize that the relevant logical volume 135 can be accessed through the second switching disk controller 131.

Thus, the disk controller switching processing has been completed.

Figures 15A, 15B:
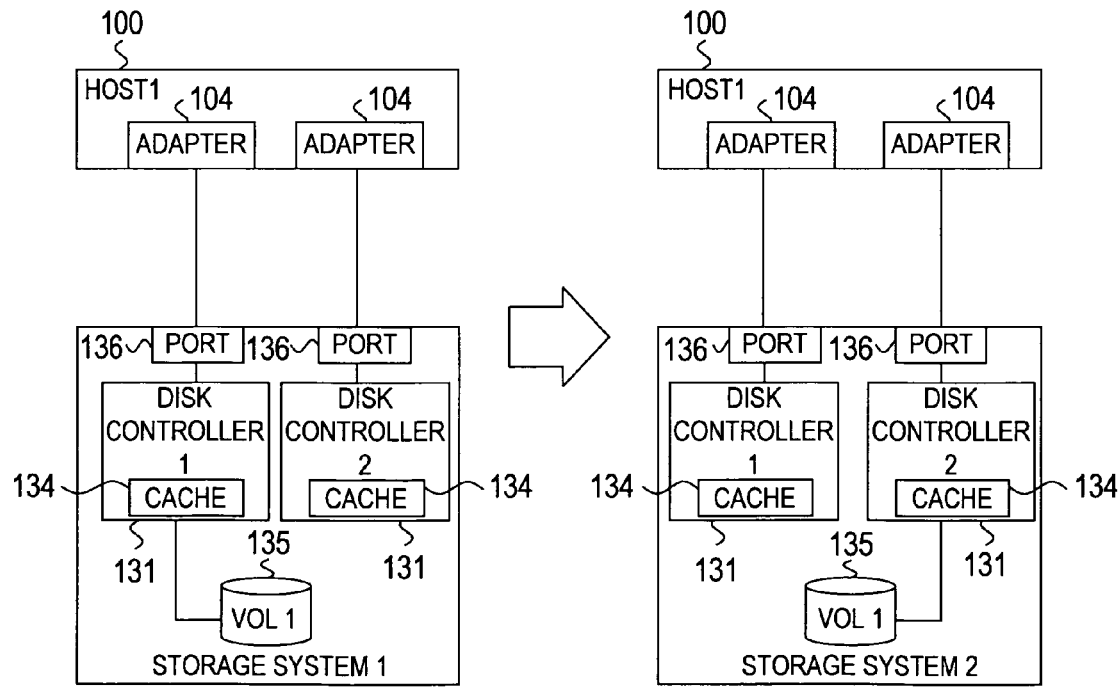
FIGS. 15A and 15B are explanatory diagrams each showing a specific example of disk controller switching processing according to the embodiment of this invention.

FIGS. 15A and 15B are explanatory diagrams showing a specific example of disk controller switching processing according to the embodiment of this invention.

FIGS. 15A and 15B show processing of switching a VOL 1 assigned to the disk controller 1 to the disk controller 2 as an example. Accordingly, in the example of FIGS. 15A and 15B, the VOL 1 corresponds to the relevant logical volume 135, the disk controller 1 corresponds to the first switching disk controller 131, and the disk controller 2 corresponds to the second switching disk controller 131.

FIG. 15A shows a storage system 130 when the disk controller switching processing of FIG. 14 is started. At a point of this time, the VOL 1 has been assigned to the disk controller 1 but not to the disk controller 2.

Subsequently, the VOL 1 is assigned to the disk controller 2 (step 1401 of FIG. 14). Next, data stored in the cache memory 134 of the disk controller 1 is copied to the cache memory 134 of the disk controller 2 (step 1402 of FIG. 14). Then, the assignment of the VOL 1 and the disk controller 1 is released (step 1403 of FIG. 14). As a result, as shown in FIG. 15B, the VOL 1 is assigned only to the disk controller 2.

As a result of the switching, a path from the host 1 through the disk controller 2 to the VOL 1 is added, and a path from the host 1 through the disk controller 1 to the VOL 1 is removed.

In this case, in the step 908 of FIG. 9, the VOL 1 is deleted from an assigned volume 504 of a line 511 of the host-storage connection information management table 204. Further, the VOL 1 is added to an assigned volume 504 of a line 512.

Figure 16:
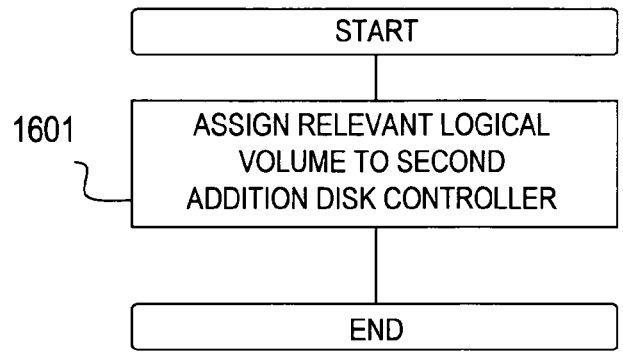
FIG. 16 is a flowchart of disk controller addition processing executed by the switching controller according to the embodiment of this invention.

FIG. 16 is a flowchart showing disk controller addition processing executed by the switching controller 201 according to the embodiment of this invention.

The disk controller addition processing is executed by the switching controller 201 in the step 1007 of the assignment review processing for each volume as shown in FIG. 10.

In the description of FIG. 16, as in the case of FIG. 11, a logical volume 135 of a processing target will be referred to as a relevant logical volume 135. A disk controller to be added 131 at a point of time of starting disk controller addition processing will be referred to as a second addition disk controller 131.

The switching controller 201 assigns the relevant logical volume 135 to the second addition disk controller 131 (1601). Specifically, the switching controller 201 may transmit an instruction of storing assignment information for correlating the relevant logical volume 131 with the second addition disk controller 131 to the storage system 130. Further, the host-storage connection information management table 204 is updated according to this assignment in the step 908 of FIG. 9.

The device link manager 103 of the host 100 refers to the updated assignment information to recognize that the relevant logical volume 135 can be accessed through both of the first addition disk controller 131 and the second addition disk controller 131.

Thus, the disk controller addition processing has been completed.

Figures 17A, 17B:
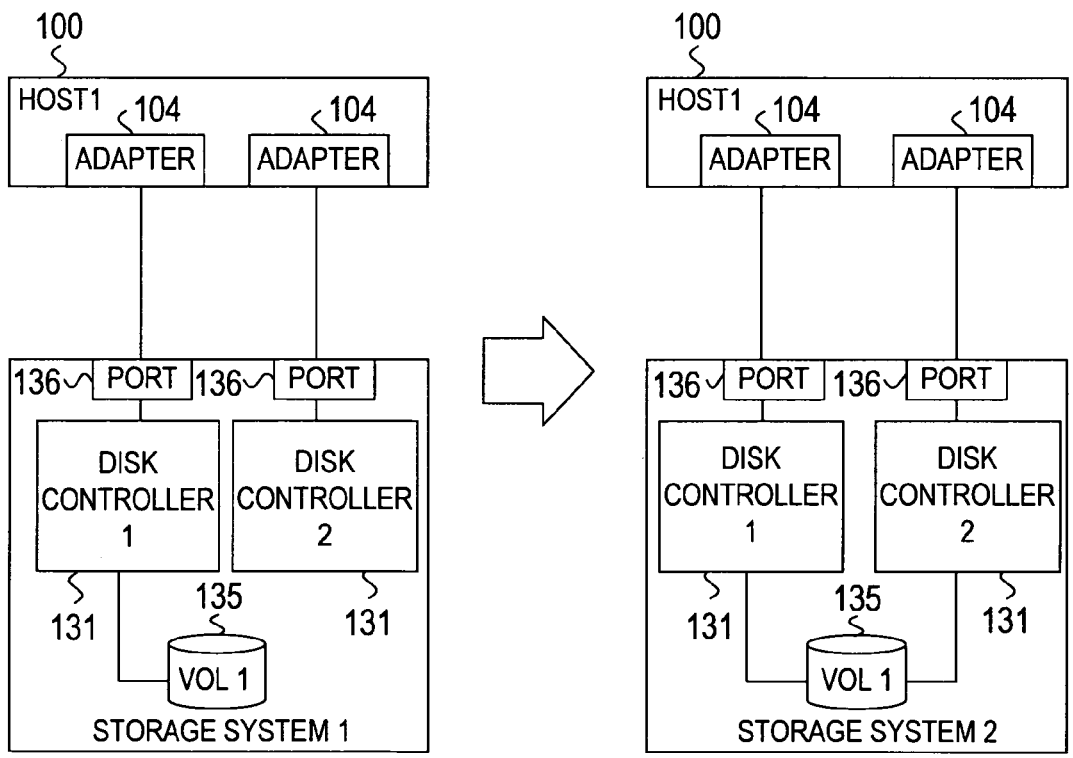
FIGS. 17A and 17B are explanatory diagrams each showing a specific example of disk controller addition processing according to the embodiment of this invention.

FIGS. 17A and 17B are explanatory diagrams showing a specific example of disk controller addition processing according to the embodiment of this invention.

FIGS. 17A and 17B show processing of adding a VOL 1 assigned to the disk controller 1 to the disk controller 2 as an example. Accordingly, in the example of FIGS. 17A and 17B, the VOL 1 corresponds to the relevant logical volume 135, the disk controller 2 corresponds to the second addition disk controller 131.

FIG. 17A shows a storage system 130 when the disk controller addition processing of FIG. 16 is started. At a point of this time, the VOL 1 has been assigned to the disk controller 1 but not to the disk controller 2.

Subsequently, the VOL 1 is assigned to the disk controller 2 (step 1601 of FIG. 16). As a result, as shown in FIG. 17B, the VOL 1 is assigned to both of the disk controllers 1 and 2.

As a result of the addition, a path from the host 1 through the disk controller 2 to the VOL 1 is added.

In this case, in the step 908 of FIG. 9, the VOL 1 is added to an assigned volume 504 of a line 512 of the host-storage connection information management table 204.

FIG. 18 is a flowchart showing pair switching processing executed by the switching controller 201 according to the embodiment of this invention.

The pair switching processing is executed by the switching controller 201 in the step 1009 of the assignment review processing for each volume as shown in FIG. 10.

First, a mode of a remote copy pair will be described.

There are two attributes for the pair of remote copy, i.e., a synchronous mode and an asynchronous mode.

In the case of the synchronous mode of the pair, when the host 100 issues a request of writing data in a primary logical volume, target data is first written in the primary logical volume. Then, the target data is transferred to a secondary logical volume, and is written in the secondary logical volume. Upon a normal end of the writing in the secondary logical volume, the storage system 130 transmits a response indicating the normal writing of the data in the primary logical volume to the host 100.

On the other hand, in the case of the asynchronous mode of the pair, when the host 100 issues a request of writing data in the primary logical volume, target data is first written in the primary logical volume. Subsequently, the target data is transferred to the secondary logical volume, and is written in the secondary logical volume. This transfer may be executed immediately after the data writing in the primary logical volume, or when a data path for interconnecting the primary and secondary logical volumes is not congested (e.g. at night). Irrespective of the end of writing in the secondary logical volume, the storage system 130 transmits a response indicating the normal writing of the data in the primary logical volume to the host 100.

Each storage system 130 may store pair information (not shown). For example, the pair information may be stored in a memory 133 or 139. The pair information may include, e.g. information indicating whether a logical volume 135 stored in the storage system 130 belongs to a pair or not, information indicating which of the primary and secondary logical volumes the logical volume 135 belonging to the pair is, information for identifying a pair volume of the logical volume 135 belonging to the pair, and information indicating a pair mode.

Next, a procedure of pair switching processing will be described.

In the description of FIG. 18, a pair to which a logical volume 135 of a processing target belongs will be referred to as a relevant pair. Further, the logical volume 135 of the processing target will be referred to as a first pair switching volume.

The switching controller 201 first determines whether the relevant pair is in an asynchronous mode or not (1801).

When it is determined in the step 1801 that the relevant pair is not in an asynchronous mode (i.e., the relevant pair is in a synchronous mode), data of the main and sub logical volumes of the pair are synchronized with each other. In this case, the processing proceeds to step 1804.

On the other hand, when it is determined in the step 1801 that the relevant pair is in an asynchronous mode, the data of the primary and secondary logical volumes of the relevant pair may not be synchronized with each other. In this case, the data must be synchronized with each other before pair switching is executed. Accordingly, the switching controller 201 changes the relevant pair to the synchronous mode (1802). At this time, the switching controller 201 may transmit an instruction of updating the mode of the pair registered as the pair information to the storage system 130.

Next, the switching controller 201 waits until the relevant pair is set in a synchronous state (i.e., state where the same data is stored in the primary and secondary logical volumes) (1803).

After the relevant pair is set in the synchronous mode, the switching controller 201 transmits pair configuration information to the device link manager 103 of the host 100 (1804). In this case, the pair configuration information includes information to identify the primary and secondary logical volumes of the relevant pair.

Next, the switching controller 201 assigns a pair volume (i.e., secondary logical volume of the relevant pair) to the pair switchable disk controller 131 returned in the step 1311 of the pair switchable disk controller search processing as shown in FIG. 13 (1805). When there are a plurality of pair switchable disk controllers 131, the switching controller 201 assigns the pair volume to the plurality of pair switchable disk controllers 131.

Next, the switching controller 201 waits until there is no more access to the first pair switching volume (1806).

Subsequently, the switching controller 201 switches the relevant pair (1807). That is, the primary logical volume of the relevant pair is changed to a secondary logical volume, and the secondary logical volume is changed to a primary logical volume. At this time, the switching controller 201 may transmit an instruction of updating the pair information according to the switching of the relevant pair to the storage system 130.

Next, the switching controller 201 releases all the assignments of the first pair switching volume and the disk controllers 131 (1808).

Thus, the pair switching processing has been completed.

FIGS. 19A and 19B are explanatory diagrams showing a specific example of pair switching processing according to the embodiment of this invention.

FIGS. 19A and 19B show execution of pair switching processing when the VOL 1 of the storage system 1 and the VOL 2 of the storage system 2 make a pair as an example. Accordingly, in the example of FIGS. 19A and 19B, a pair constituted of the VOL 1 and the VOL 2 corresponds to a relevant pair, the VOL 1 corresponds to a first pair switching logical volume 135, and the VOL 2 corresponds to a pair volume. A disk controller 3 corresponds to the pair switchable disk controller 131 in the step 1311 of FIG. 13.

In FIGS. 19A and 19B, logical volumes 135 connected together by an arrow make a pair. The logical volume 135 at the base of the arrow is a primary logical volume, and the logical volume 135 at the tip of the arrow is a secondary logical volume.

FIG. 19A shows a storage system 130 at a point of time of starting the pair switching processing of FIG. 18. At this time, a VOL 1 (primary logical volume) is assigned to the disk controller 1 while a VOL 2 (secondary logical volume) is not assigned to the disk controller 3.

Subsequently, the VOL 2 is assigned to the disk controller 3 (step 1805 of FIG. 18). Further, the VOL 1 is changed to a secondary logical volume, and the VOL 2 is changed to a primary logical volume. As a result, as shown in FIG. 19B, the VOL 2 becomes the primary logical volume assigned to the disk controller 3.

As a result of the pair switching, a path from the host 1 through the disk controller 3 to the VOL 2 is added. A path from the host 1 through the disk controller 1 to the VOL 1 is removed.

In this case, at a point of time of FIG. 19A, a VOL 2 has not been registered in the assigned volume 504 of a line 513 of the host-storage connection information management table 204. Subsequently, in the step 908 of FIG. 9, the VOL 1 is deleted from the assigned volume 504 of a line 511 of the host-storage connection information management table 204. Further, a VOL 2 is added to the assigned volume 504 of the line 513. Then, a primary/secondary 604 of a line 611 of the volume pair state management table 205 is updated to a secondary, while a primary/secondary 604 of a line 612 is updated to a primary.

Next, processing executed by the device link manager 103 of the host 100 will be described.

As described above, the device link manager 103 includes a program executed by the CPU 101 and information referred to by the program. Accordingly, processing executed by the device link manager 103 and described below is actually executed by the CPU 101.

Figure 20:
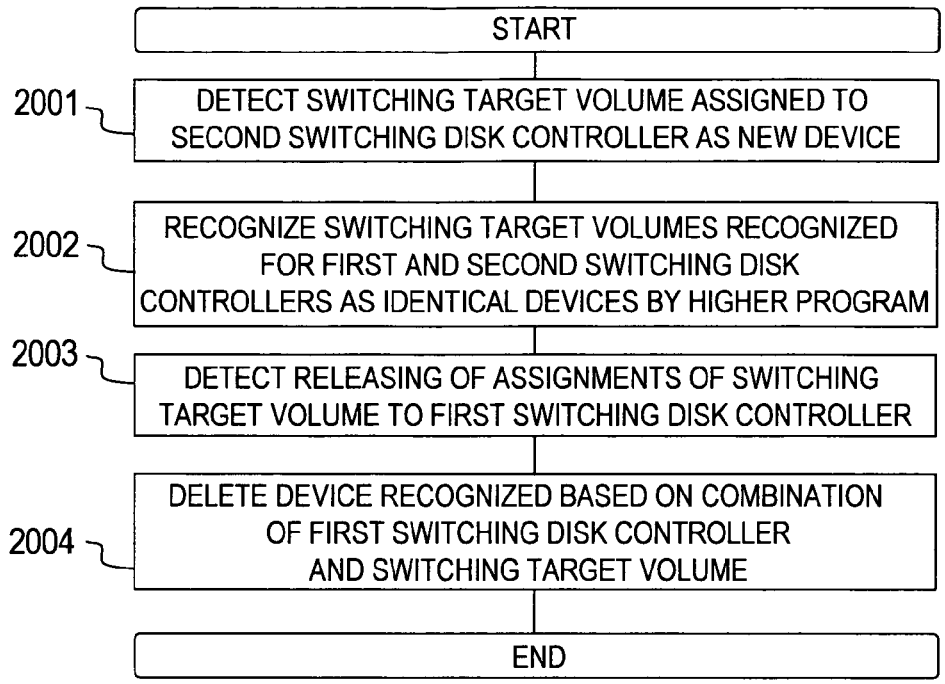
FIG. 20 is a flowchart of processing executed by a device link manager during disk controller switching according to the embodiment of this invention.

FIG. 20 is a flowchart showing processing executed by the device link manager 103 during the switching of the disk controller 131 according to the embodiment of this invention.

The processing shown in FIG. 20 is executed by the device link manager 103 when the switching controller 201 executes the disk controller switching processing as shown in FIGS. 14, 15A, and 15B.

The device link manger 103 first detects a logical volume 135 of a switching target assigned to the second switching disk controller 131 as a new device (2001). At this time, the device link manager 103 may refer to assignment information (not shown) stored in the storage system 130. In the example of FIGS. 15A and 15B, the disk controller 2 is a second switching disk controller 131, and the VOL 1 is a logical volume 135 of a switching target.

A higher program (e.g., application program) of the host 100 recognizes the device as a logical storage device. For example, the device is a so-called logical unit (LU).

Next, the device link manager 103 causes the higher program (e.g., application program) to recognize that a device recognized based on a combination of the second switching disk controller 131 and the logical volume 135 of the switching target is identical to a device recognized based on a combination of the first switching disk controller 131 and the logical volume 135 of the switching target (2002). In the example of FIGS. 15A and 15B, the disk controller 1 is a first switching disk controller 131.

Subsequently, the device link manger 103 detects releasing of the assignment of the primary switching disk controller 131 and the logical volume 135 of the switching target (2003). This releasing is executed in the step 1403 of FIG. 14.

Next, the device link manager 103 deletes the device recognized based on the combination of the first switching disk controller 131 and the logical volume 135 of the switching target (2004).

Thus, the processing has been completed.

Figure 21:
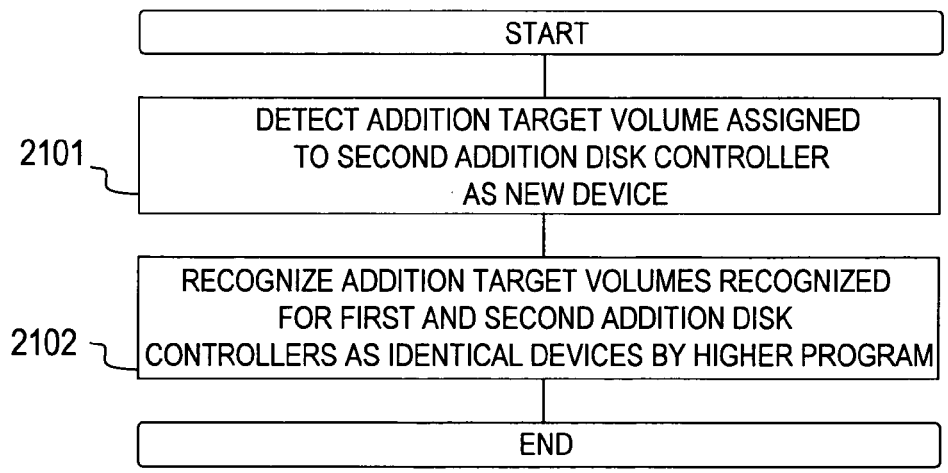
FIG. 21 is a flowchart of processing executed by the device link manager during disk controller addition according to the embodiment of this invention.

FIG. 21 is a flowchart showing processing executed by the device link manager 103 during the addition of the disk controller 131 according to the embodiment of this invention.

The processing shown in FIG. 21 is executed by the device link manager 103 when the switching controller 201 executes the disk controller addition processing as shown in FIGS. 16, 17A, and 17B.

In the description of FIG. 21, a disk controller 131 to which a logical volume 135 has been assigned before addition of the disk controller 131 is executed (disk controller 1 in the example of FIGS. 17A and 17B) will be referred to as a first addition disk controller.

The device link manger 103 first detects a logical volume 135 of an addition target assigned to the second addition disk controller 131 as a new device (2101). In the example of FIGS. 17A and 17B, the disk controller 2 is a second addition disk controller 131, and the VOL 1 is a logical volume 135 of an addition target.

Next, the device link manager 103 causes a higher program (e.g., application program) to recognize that a device recognized based on a combination of the second addition disk controller 131 and the logical volume 135 of the addition target is identical to a device recognized based on a combination of the first addition disk controller 131 and the logical volume 135 of the addition target (2102).

Thus, the processing has been completed.

Figure 22:
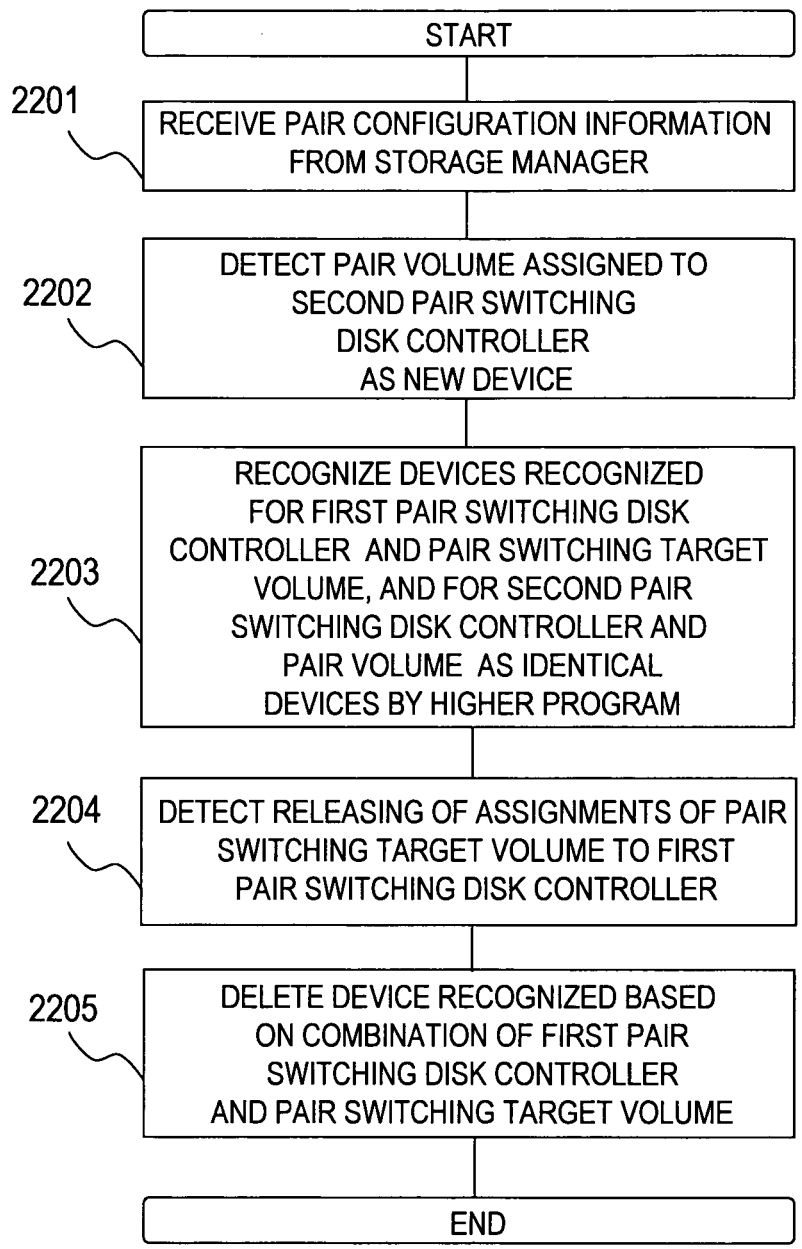
FIG. 22 is a flowchart of processing executed by the device link manager during pair switching according to the embodiment of this invention.

FIG. 22 is a flowchart showing processing executed by the device link manager 103 during the pair switching according to the embodiment of this invention.

The processing shown in FIG. 22 is executed by the device link manager 103 when the switching controller 201 executes the pair switching processing as shown in FIGS. 18, 19A, and 19B.

In the description of FIG. 22, a pair of a switching target will be referrer to as a relevant pair, a primary logical volume of the relevant pair before switching will be referred to as a pair switching target volume, a disk controller 131 to which a pair switching target volume has been assigned will be referred to as a first pair switching disk controller 131, a secondary logical volume of the relevant pair before switching will be referred to as a pair volume, and a disk controller 131 to which the pair volume is assigned will be referred to as a second pair switching disk controller 131. In the example of FIGS. 19A and 19B, a VOL 1 is a pair switching target volume, a disk controller 1 is a first pair switching disk controller 131, a VOL 2 is a pair volume, and a disk controller 3 is a second pair switching disk controller 131.

The device link manger 103 first receives pair configuration information regarding the relevant pair from the switching controller 201 of the storage manager 113 (2201). This configuration information has been transmitted in the step 1804 of FIG. 18.

Next, the device link manager 103 detects a pair volume assigned to the second pair switching disk controller 131 as a new device (2202). In this case, the second pair switching disk controller 131 is a pair switchable disk controller 131 in the step 1805 of FIG. 18. The pair volume is a pair volume in the step 1805 of FIG. 18.

Then, the device link manager 103 causes a higher program (e.g., application program) to recognize that a device recognized based on a combination of the pair switching target volume and the first pair switching disk controller 131 is identical to a device recognized based on a combination of the pair volume and the second pair switching disk controller 131 (2203).

Subsequently, the device link manger 103 detects releasing of the assignment of the first pair switching disk controller 131 and the pair switching target volume (2204). This releasing is executed in the step 1808 of FIG. 18.

Next, the device link manager 103 deletes the device recognized based on the combination of the first pair switching disk controller 131 and the pair switching target volume (2205).

Thus, the processing has been completed.

According to the embodiment of this invention, the storage manager 113 is stored in the management server 110 connected to the IP network 150 to be executed by the CPU 111 of the management server 110. However, the storage manager 113 may be stored in the FC-SW 120 to be executed by the CPU (not shown) of the FC-SW 120. In this case, when the storage manager 113 transmits/receives an instruction, data or the like to/from the host 100 or the storage system 130, the transmission/reception is executed through the SAN (i.e., In-Band).

Alternatively, the storage manager 113 may be stored in one storage system 130 to be executed by the CPU 132 or 138. In this case, data or the like is transmitted/received by In-Band transmission.

Otherwise, the storage managers 113 may be stored in all the storage systems 130 to be executed by the CPU 132 or 138. In this case, each storage system 130 may mange only the information thereof, and communicates the information with one another through the SAN to share the information. In this case, data or the like is transmitted/received by In-Band transmission.

According to the embodiment of this invention, the storage manager 113 monitors the access loads of the respective disk controllers 131, and changes the assignment of the logical volume 135 to the disk controller 131 when the access loads are concentrated (i.e., access loads are not properly balanced). The assignment changing is switching or addition of the disk controller 131. Alternatively, the storage manager 113 switches a pair to which the logical volume 135 belongs. As a result, a new path is set from the host 100 to the logical volume 135, or the set path is removed. The host manager 103 of the host 100 assigns accesses to the new path, whereby the access loads by the host 100 are properly balanced to the entire computer system.

What is claimed is:

1. A control method for a computer system comprising one or more host computers, one or more storage systems, and a management computer,
    the host computer and the storage system being connected to the management computer through a first network,
    the host computer and the storage system being connected to each other through a second network,
    the management computer comprising:
        a first interface connected to the first network;
        a first processor connected to the first interface; and
        a first memory connected to the first processor,
    the host computer comprising:
        a second interface connected to the first network;
        a third interface connected to the second network;
        a second processor connected to the second interface and the third interface; and
        a second memory connected to the second processor,
    the storage system comprising:
        a fourth interface connected to the first network;
        a third processor connected to the fourth interface;
        a third memory connected to the third processor;
        one or more fifth interfaces connected to the second network;
        a plurality of controllers connected to the one or more fifth interfaces; and
        one or more logical volumes for storing data used by the host computer,
    each of the controllers comprising:
        a fourth processor connected to the fifth interface; and
        a fourth memory connected to the fourth processor,
    the controllers including at least one first controller to which one of the logical volumes is assigned and at least one second controller to which the one of the logical volume is not assigned,
    wherein paths connecting the host computer and the logical volumes pass through the controllers,
    the method comprising:
        monitoring a load of the first controller to determine whether or not performance information of the first controller exceeds a predetermined threshold by the first processor; and
        assigning the logical volume assigned to the first controller to the second controller by the first processor by switching one of the paths connecting the host computer to the assigned logical volume when the performance information of the first controller exceeds the predetermined threshold.

2. The method according to claim 1, wherein the first processor predicts performance information when the logical volume is assigned to one of the second controllers, and assigns the logical volume to another second controller when the predicted performance information exceeds the predetermined threshold.

3. The method according to claim 1, wherein the first processor releases the assignment of the logical volume assigned to the first controller when the performance information of the first controller exceeds the predetermined threshold.

4. The method according to claim 3, wherein:
    each of the controllers comprises a cache memory for storing at least one of data read from the logical volume or data to be written in the logical volume; and
    the first processor copies data regarding the logical volume stored in the cache memory of the first controller to the second controller when the logical volume assigned to the first controller is assigned to the second controller and the assignment of the logical volume to the first controller is released.

5. The method according to claim 1, wherein the performance information of the controller is a usage rate of the fourth processor.

6. The method according to claim 1, wherein the method further comprises monitoring the loads of each of the controllers but not monitoring the load of the one or more host computers.

7. The method according to claim 2, wherein the method further comprises monitoring the loads of each of the controllers but not monitoring the load of the one or more host computers.

8. The method according to claim 3, wherein the method further comprises monitoring the loads of each of the controllers but not monitoring the load of the one or more host computers.

9. A control method for a computer system comprising one or more host computers, and a plurality of storage systems,
    a management computer being connected to the host computer and the plurality of storage systems through a first network,
    the host computer and the storage system being connected to each other through a second network,
    the management computer comprising:
        a first interface connected to the first network;
        a first processor connected to the first interface; and
        a first memory connected to the first processor,
    the host computer comprising:
        a second interface connected to the first network;
        a third interface connected to the second network;
        a second processor connected to the second interface and the third interface; and
        a second memory connected to the second processor,
    each of the storage systems comprising:
        a fourth interface connected to the first network;
        a third processor connected to the fourth interface;
        a third memory connected to the third processor;
        one or more fifth interfaces connected to the second network;
        one or more controllers connected to the one or more fifth interfaces; and
        one or more logical volumes for storing data used by the host computer,
    each of the controllers comprising:
        a fourth processor connected to the fifth interface; and
        a fourth memory connected to the fourth processor,
    the plurality of storage systems comprising at least a first storage system comprising a first logical volume and a second storage system comprising a second logical volume, and the first logical volume and the second logical volume making a pair of remote copy in which the first logical volume is a copy source and the second logical volume is a copy destination, wherein paths connecting the host computer and the logical volumes pass through the controllers, the control method comprising:

assigning the second logical volume to at least one of the controllers of the second storage system when performance information of the controller to which the first logical volume is assigned exceeds a predetermined threshold based on monitoring a load of the at least one of the controllers, by switching one of the paths connecting the host computer to the assigned logical volume;

changing the first logical volume to a copy destination and the second logical volume to a copy source; and releasing the assignment of the first logical volume to the controller.

10. The method according to claim 9, further comprising:

changing an attribute of the pair to a synchronous mode before the second logical volume is assigned to at least one of the controllers of the second storage system when the attributes of the pair constituted of the first logical volume and the second logical volume is an asynchronous mode.

11. The method according to claim 9, further comprising:

predicting performance information when the second logical volume is assigned to one of the controllers of the second storage system; and assigning the second logical volume to another controller of the second storage system when the predicted performance information exceeds the predetermined threshold.

12. The method according to claim 9, further comprising:

causing the second processor to recognize a device recognized based on a combination of the second logical volume and the controller to which the second logical volume is assigned as the same device as that recognized based on a combination of the first logical volume and the controller to which the first volume is assigned.

13. The method according to claim 9, wherein the method further comprises monitoring the loads of each of the controllers but not monitoring the load of the one or more host computers.

14. The method according to claim 11, wherein the method further comprises monitoring the loads of each of the controllers but not monitoring the load of the one or more host computers.

15. A management computer connected to one or more host computers and one or more storage systems through a first network, the host computer and the storage system being connected to each other through a second network, the management computer comprising:
a first interface connected to the first network;
a first processor connected to the first interface; and
a first memory connected to the first processor,
wherein:
the host computer comprises:
a second interface connected to the first network;
a third interface connected to the second network;
a second processor connected to the second interface and the third interface; and
a second memory connected to the second processor,
the storage system comprises:
a fourth interface connected to the first network;
a third processor connected to the fourth interface;
a third memory connected to the third processor;
one or more fifth interfaces connected to the second network;
a plurality of controllers connected to the one or more fifth interfaces; and
one or more logical volumes for storing data used by the host computer,
each of the controllers comprises:
a fourth processor connected to the fifth interface; and
a fourth memory connected to the fourth processor,
wherein paths connecting the host computer and the logical volumes pass through the controllers, wherein the controllers include at least one first controller to which one of the logical volumes is assigned and at least one second controller to which the one of the logical volume is not assigned, and
wherein the first processor monitors a load of the first controller to determine whether or not performance information of the first controller exceeds a predetermined threshold, and assigns the logical volume assigned to the first controller to the second controller when the performance information of the first controller exceeds the predetermined threshold by switching one of the paths connecting the host computer to the assigned logical volume.

16. The management computer according to claim 15, wherein the first processor predicts performance information when the logical volume is assigned to one of the second controllers, and assigns the logical volume to another second controller when the predicted performance information exceeds the predetermined threshold.

17. The management computer according to claim 15, wherein the first processor releases the assignment of the logical volume assigned to the first controller when the performance information of the first controller exceeds the predetermined threshold.

18. The management computer according to claim 17, wherein:

each of the controllers comprises a cache memory for storing at least one of data read from the logical volume or data to be written in the logical volume; and the first processor copies data regarding the logical volume stored in the cache memory of the first controller to the second controller when the logical volume assigned to the first controller is assigned to the second controller and the assignment of the logical volume to the first controller is released.

19. The management computer according to claim 15, wherein the performance information of the controller is a usage rate of the fourth processor.

20. The management computer according to claim 15, wherein the first processor monitors the loads of each of the controllers but not monitoring the load of the one or more host computers.

21. The management computer according to claim 16, wherein the first processor monitors the loads of each of the controllers but not monitoring the load of the one or more host computers.

22. The management computer according to claim 17, wherein the first processor monitors the loads of each of the controllers but not monitoring the load of the one or more host computers.

23. A computer system, comprising:
one or more host computers;
a plurality of storage systems; and
a management computer, wherein:
the management computer is connected to the host computer and the plurality of storage systems through a first network,
the host computer and the storage system are connected to each other through a second network,
the management computer comprises:
  a first interface connected to the first network;
  a first processor connected to the first interface; and
  a first memory connected to the first processor,
the host computer comprises:
  a second interface connected to the first network;
  a third interface connected to the second network;
  a second processor connected to the second interface and the third interfaces; and
  a second memory connected to the second processor,
the storage system comprises:
  a fourth interface connected to the first network;
  a third processor connected to the fourth interface;
  a third memory connected to the third processor;
  one or more fifth interfaces connected to the second network;
  one or more controllers connected to the one or more fifth interfaces; and
  one or more logical volumes for storing data used by the host computer,
each of the controllers comprises:
  a fourth processor connected to the fifth interface; and
  a fourth memory connected to the fourth processor,
the plurality of storage systems comprise at least a first storage system comprising a first logical volume and a second storage system comprising a second logical volume,
the first logical volume and the second logical volume make a pair of remote copy in which the first logical volume is a copy source and the second logical volume is a copy destination, and
wherein paths connecting the host computer and the logical volumes pass through the controllers,
wherein the first processor assigns the second logical volume to at least one of the controllers of the second storage system when performance information of the controller to which the first logical volume is assigned exceeds a predetermined threshold based on monitoring a load of the at least one of the controllers, by switching one of the paths connecting the host computer to the assigned logical volume, changes the first logical volume to a copy destination and the second logical volume to a copy source, and releases the assignment of the first logical volume to the controller.

24. The computer system according to claim 23, wherein the first processor changes an attribute of the pair to a synchronous mode before the second logical volume is assigned to at least the one of the controllers of the second storage system when the attributes of the pair constituted of the first logical volume and the second logical volume is an asynchronous mode.

25. The computer system according to claim 23, wherein the first processor predicts performance information when the second logical volume is assigned to one of the controllers of the second storage system, and assigns the second logical volume to another controller of the second storage system when the predicted performance information exceeds the predetermined threshold.

26. The computer system according to claim 23, wherein:
the first processor transmits pair configuration information indicating that the first logical volume and the second logical volume make a pair to the host computer using the first logical volume; and
the second processor receives the pair configuration information, and recognizes a device recognized based on a combination of the second logical volume and the controller to which the second logical volume is assigned as the same device as that recognized based on a combination of the first logical volume and the controller to which the first volume is assigned.

27. The management computer according to claim 23, wherein the first processor monitors the loads of each of the controllers but not monitoring the load of the one or more host computers.

28. The management computer according to claim 25, wherein the first processor monitors the loads of each of the controllers but not monitoring the load of the one or more host computers.

* * * * *